US006589324B2

(12) United States Patent
Kamo et al.

(10) Patent No.: US 6,589,324 B2
(45) Date of Patent: *Jul. 8, 2003

(54) AGENT FOR TREATING METALLIC SURFACE, SURFACE-TREATED METAL MATERIAL AND COATED METAL MATERIAL

(75) Inventors: Hiroaki Kamo, Ohtsu (JP); Yasunari Hotta, Ohtsu (JP); Toshiyuki Shimizu, Ohtsu (JP); Hisao Odashima, Okayama (JP)

(73) Assignee: Toyo Boseki Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/298,755

(22) Filed: Apr. 22, 1999

(65) Prior Publication Data

US 2002/0098345 A1 Jul. 25, 2002

(30) Foreign Application Priority Data

Apr. 22, 1998 (JP) ............................................. 10-112442
May 15, 1998 (JP) ............................................. 10-133029
Jun. 9, 1998 (JP) ............................................. 10-160079

(51) Int. Cl.[7] ........................... C04B 9/02; C23C 22/07; B21D 39/00; B32B 15/08
(52) U.S. Cl. ............................. 106/14.12; 106/14.44; 148/259; 428/336; 428/339; 428/621; 428/626; 428/632
(58) Field of Search ................................... 428/624, 632, 428/336, 403, 339, 621, 626; 106/14.05, 14.34, 14.44, 14.12; 148/259, 251, 260, 279

(56) References Cited

U.S. PATENT DOCUMENTS

| 2,892,797 | A | * | 6/1959 | Alexander et al. ............ 252/313 |
| 4,881,975 | A | | 11/1989 | Collier et al. ................ 106/14.05 |
| 5,061,314 | A | | 10/1991 | Collier et al. ................ 106/14.05 |
| 5,061,315 | A | * | 10/1991 | Collier et al. ................ 106/14.05 |
| 5,246,507 | A | * | 9/1993 | Kodama et al. .............. 148/250 |
| 5,326,389 | A | | 7/1994 | Cambon ...................... 106/14.44 |
| 5,645,650 | A | * | 7/1997 | Ishizaki et al. .............. 148/260 |
| 5,646,211 | A | * | 7/1997 | Honda et al. ................. 524/406 |
| 6,040,054 | A | * | 3/2000 | Odashima et al. ............ 428/413 |
| 6,190,780 | B1 | * | 2/2001 | Shoji et al. .................. 428/472 |

FOREIGN PATENT DOCUMENTS

| DE | 3233092 | * | 10/1983 |
| EP | 273698 | | 7/1988 |
| WO | WO 91/16381 | | 10/1991 |

OTHER PUBLICATIONS

*Database WPI*, Section Ch, Week 7608, Derwent Publications Ltd., London, GB; AN–76–13571X, XP002108486, Abstract of JP 51 000528 A (Seto Yogyo Genryo) (1976).
*Patent Abstracts of Japan*, vol. 096, No. 007, Abstract of JP 08 072197 A(Toyo Kohan Co Ltd) (1996).

* cited by examiner

*Primary Examiner*—Holly Rickman
(74) *Attorney, Agent, or Firm*—Leydig, Voit & Mayer, Ltd.

(57) ABSTRACT

A chromium-free agent for treating metallic surface comprising the following (i)–(iv):

(i) at least one of (A) a mixture of an aluminum salt and an inorganic oxide particle and (B) an aluminum-containing inorganic oxide particle comprising aluminum, oxygen and at least one element other than these two (ii) a salt of a metal other than aluminum (iii) a phosphorus compound (iv) a resin and/or a precursor thereof provided that when (i) is a mixture of an aluminum salt and an inorganic oxide particle, the equivalent ratio of phosphorus/aluminum is not less than 0.1.

The agent for treating metallic surface is applied to the surface of a metal material such as steel plate, plated steel plate, alloy-plated steel plate, alloy plate, silicon steel plate, stainless steel plate, shape steel, pipe, wire material and the like, and dried to form a film superior in corrosion resistance, adhesion to a metal material and adhesion to a paint. The present invention is further relates to a metal material which has been subjected to a surface treatment with said agent for treating metallic surface, and to a metal material obtained by applying a resin to said metal material.

37 Claims, No Drawings

AGENT FOR TREATING METALLIC SURFACE, SURFACE-TREATED METAL MATERIAL AND COATED METAL MATERIAL

TECHNICAL FIELD OF THE INVENTION

The present invention relates to an agent for treating metallic surface, which is to be applied to the surface of a metal material such as a steel plate, plated steel plate, alloy-plated steel plate, alloy plate, silicon steel plate, stainless steel plate, shape steel, pipe, wire material and the like and dried to form a rust-proof film, a metal material which has been subjected to a surface treatment with said agent for treating metallic surface (hereinafter to be also referred to as a surface-treated metal material), and to a metal material obtained by applying a resin to said metal material (hereinafter to be also referred to as a coated metal material).

BACKGROUND OF THE INVENTION

To improve corrosion resistance of a cold draw steel plate, a Zn-plated steel plate, a steel plate plated with Zn alloy (e.g., Zn—Ni, Zn—Ni—Co, Zn—Ni—Cr, Zn—Fe, Zn—Co, Zn—Cr, Zn—Mn and the like), a steel plate plated with a metal (e.g., Ni, Cu, Pb, Sn, Cd, Al, Ti and the like), a steel plate plated with an alloy of these metals, and the like, these plates are typically treated with chromate to form a chromate film.

This chromate treatment is largely divided into an electrolytic chromate treatment and a coating chromate treatment. By the electrolytic chromate treatment at the negative electrode using chromic acid as the main component and various other compounds, a chromate film is formed by an electrolytic treatment of the steel plate. By the coating chromate treatment, a chromate film is formed by applying a liquid containing a trivalent or hexavalent chromium as the main component and an inorganic colloidal compound, inorganic anionic, inorganic cationic compound, and the like.

In addition, a coating chromate treatment, a so-called resin type chromate treatment, wherein an organic resin is used, has recently been developed as one of the coating chromate treatments. For example, there have been developed a treatment method wherein a liquid containing chromic acid, amorphous silica, phosphoric compound, and poly(acrylic acid) is applied and a C/Si ratio of the outermost film layer is specified (Japanese Patent Unexamined Publication No. 163385/1990); a method wherein an acrylic copolymer emulsion comprising methyl methacrylate and the like as polymerizable components is added to a chromate liquid under specific conditions and used for the treatment (Japanese Patent Unexamined Publication No. 179883/1990); a method wherein a liquid containing chromic acid, a reduction product of chromic acid, an acrylic emulsion and silica sol under specific conditions is applied (Japanese Patent Unexamined Publication No.215683/1991); a method wherein a liquid containing chromic acid, a reduction product of chromic acid, an acrylic emulsion and a wet type silica sol is used for the treatment (Japanese Patent Unexamined Publication No. 215681/1991); a method wherein a composition for a metallic surface treatment comprising an aqueous emulsion comprising an unsaturated ethylene carboxylic acid component, a hydroxy-containing monomer component and other unsaturated ethylene compound, a water soluble chromium compound, an aqueous colloid containing inorganic compound, and an inorganic compound that reacts with amphoteric metal and forms sparingly water soluble salt, is used (Japanese Patent Unexamined Publication No.230666/1993); and other method.

Of the chromate films, a chromate film formed by an electrolytic chromate treatment suffers less from the elution of Cr but has insufficient corrosion resistance. In addition, the film shows poor resistance to flaw during processing, which in turn results in markedly degraded corrosion resistance after processing. In addition, a chromate film formed by the coating chromate treatment undesirably allows easy elution of the chromium component in the chromate film when used as obtained by the treatment and is problematic from the aspect of pollution. In addition, the corrosion resistance and adhesion to a paint of the film are not entirely satisfactory. The film often obtains flaws during processing and the corrosion resistance of the film is considerably degraded by processing. Moreover, the resin type chromate treatment is insufficient in that a treatment liquid has short life since it becomes a gel and separates into different phases, and the obtained film has insufficient resistance to the elution of chromium.

In view of the recent tendency toward drastically reinforced regulation on the use of chromium (particularly hexavalent chromium) out of the concern of the environmental and pollution problems, corrosion resistant coating compositions free of chromium have been developed. Such composition is exemplified by a polymer emulsion obtained by polymerizing a polymerizable unsaturated monomer containing a specific amount of unsaturated carboxylic acid (Japanese Patent Unexamined Publication No. 222324/1993); a composition containing an acetoacetyl-containing aqueous synthetic resin dispersion as a main component (Japanese Patent Unexamined Publication No. 148432/1993); a mixture of a substantially water insoluble mono- or polybasic salt of special keto acid with a base selected from cation, amine, guanidine and amidine (Japanese Patent Unexamined Publication No. 70715/1993); a resin copolymer of unsaturated carboxylic acid-glycidyl-containing unsaturated monomer—monomer copolymerizable with alkyl acrylate-alkyl acrylate (Japanese Patent Unexamined Publication No.192166/1991) and the like. The film obtained by applying any of these, which is a special resin or a mixture of a special resin and an inorganic compound, has poor corrosion resistance, wherein an increase in the thickness of the film (for example to 3–5 $\mu$m) cannot ensure sufficient corrosion resistance. What is more, the film does not always show superior adhesion to various metals constituting the surface of an iron steel plate or steel plates plated with various metals. Under a wet environment, the film shows dramatically degraded adhesive property, to the point that the film comes off and falls. There exists no film capable of maintaining superior adhesive property even under wet environment. In addition, the film thus formed is easily destroyed during processing and comes off easily.

The film of the present invention resolves the above-mentioned shortcomings in the prior art technique and provides a chromium-free agent for treating metallic surface, which is to be applied to the surface of a metal material, such as steel plate, plated steel plate, alloy-plated steel plate, alloy plate, silicon steel plate, stainless steel plate, shape steel, pipe, wire material and the like, and dried to form a film superior in corrosion resistance, adhesion to a metal material and adhesion to a paint, a metal material which has been subjected to a surface treatment with said agent for treating metallic surface, and to a metal material obtained by applying a resin to said metal material.

SUMMARY OF THE INVENTION

Accordingly, the present invention provides the following.

(1) A chromium-free agent for treating metallic surface comprising the following
- (i) at least one of (A) a mixture of an aluminum salt and an inorganic oxide particle and (B) an aluminum-containing inorganic oxide particle comprising aluminum, oxygen and at least one element other than these two
- (ii) a salt of a metal other than aluminum
- (iii) a phosphorus compound
- (iv) a resin and/or a precursor thereof provided that when (i) is a mixture of an aluminum salt and an inorganic oxide particle, the equivalent ratio of phosphorus/aluminum is not less than 0.1.

(2) The agent for treating metallic surface of (1) above, wherein the inorganic oxide particle is a particle of an oxide of at least one element selected from the group consisting of Si, Fe, Ge, Ti, Zr, Mg, Sn, Sb and Al.

(3) The agent for treating metallic surface of (1) above, wherein the inorganic oxide particle is an $SiO_2$ particle.

(4) The agent for treating metallic surface of any of (1)–(3) above, wherein the inorganic oxide particle content is 2–80 parts by weight per 100 parts by weight of the resin and/or the precursor thereof.

(5) The agent for treating metallic surface of any of (1)–(3) above, wherein the inorganic oxide particle has a particle size of 1–20 nm.

(6) The agent for treating metallic surface of (1) above, wherein the aluminum-containing inorganic oxide particle is an inorganic oxide particle surface-treated with an aluminum compound.

(7) The agent for treating metallic surface of (1) above, wherein the inorganic oxide of the aluminum-containing inorganic oxide particle is an oxide of at least one element selected from the group consisting of Si, Fe, Ge, Ti, Zr, Mg, Sn and Sb.

(8) The agent for treating metallic surface of (1) above, wherein the inorganic oxide of the aluminum-containing inorganic oxide particle is $SiO_2$.

(9) The agent for treating metallic surface of any of (1) and (6)–(8) above, wherein the aluminum-containing inorganic oxide particle content is 2–80 parts by weight per 100 parts by weight of the resin and/or the precursor thereof.

(10) The agent for treating metallic surface of any of (1) and (6)–(8) above, wherein the aluminum-containing inorganic oxide particle has a particle size of 1–20 nm.

(11) The agent for treating metallic surface of (1) above, further comprising an aluminum salt or an inorganic oxide particle when (i) is the aluminum-containing inorganic oxide particle.

(12) The agent for treating metallic surface of (1) above, wherein the aluminum salt is an aluminum salt of at least one member selected from the group consisting of phosphate, monohydrogenphosphate, dihydrogenphosphate, acetate, formate, nitrate, sulfate, chloride, bromide, fluoride, oxalate, nitrite, sulfite, hydrogensulfite, silicate, bioxalate, bifluoride, carbonate, hydrogencarbonate, hydrogensulfate, polyphosphate, hypophosphite, tripolyphosphate, hexametaphosphate, polymetaphosphate and phosphonate.

(13) The agent for treating metallic surface of (1) above, wherein the aluminum salt is an aluminum salt of at least one member selected from the group consisting of phosphate, monohydrogenphosphate and dihydrogenphosphate.

(14) The agent for treating metallic surface of (1) above, wherein the aluminum salt content is 0.005–10 moles per 100 g of the resin and/or the precursor thereof.

(15) The agent for treating metallic surface of (1) above, wherein the salt of the metal other than aluminum is a salt of at least one member selected from polyvalent metals.

(16) The agent for treating metallic surface of (1) above, wherein the salt of the metal other than aluminum is a salt of at least one member selected from the group consisting of Cu, Co, Fe, Mn, Sn, V, Ba, Mg, Zr, W, Mo, Ca, Sr, Nb, Y and Zn.

(17) The agent for treating metallic surface of (1) above, wherein the salt of the metal other than aluminum is a salt of at least one member selected from the group consisting of Mn, Mg, Zr, W, Mo, Ca and Sr.

(18) The agent for treating metallic surface of (1) above, wherein the salt of the metal other than aluminum is an Mn salt.

(19) The agent for treating metallic surface of any of (1) and (15)–(18) above, wherein the salt of the metal other than aluminum is a salt of a metal other than aluminum, which is at least one member selected from the group consisting of phosphate, monohydrogenphosphate, dihydrogenphosphate, acetate, formate, nitrate, sulfate, chloride, bromide, fluoride, oxalate, nitrite, sulfite, hydrogensulfite, silicate, bioxalate, bifluoride, carbonate, hydrogencarbonate, hydrogensulfate, polyphosphate, hypophosphite, tripolyphosphate, hexametaphosphate, polymetaphosphate and phosphonate.

(20) The agent for treating metallic surface of any of (1) and (15)–(18) above, wherein the salt of the metal other than aluminum is a salt of a metal other than aluminum, which is at least one member selected from the group consisting of phosphate, monohydrogenphosphate and dihydrogenphosphate.

(21) The agent for treating metallic surface of (1) above, wherein a content of the salt of the metal other than aluminum is 0.005–10 moles per 100 g of the resin and/or the precursor thereof.

(22) The agent for treating metallic surface of (1) above, wherein the total content of the aluminum salt and the salt of the metal other than aluminum is 0.005–10 moles per 100 g of the resin and/or the precursor thereof.

(23) The agent for treating metallic surface of (1) above, wherein the resin is at least one member selected from the group consisting of acrylic resin, polyester resin, epoxy resin, acryl-epoxy resin, acryl-modified polyester resin, epoxy-modified polyester resin, urethane-modified polyester resin, acryl-modified polyurethane resin and acryl-modified polyester polyurethane resin.

(24) The agent for treating metallic surface of (1) or (23) above, wherein a content of the resin and/or the precursor thereof is 30–80 wt of the entire constituent component.

(25) A metal material surface-treated with the agent for treating metallic surface of any of (1)–(24) above.

(26) A coated metal material comprising at least a metal material, a chromium-free surface treatment layer having a thickness of not more than 5 μm and a resin coating layer successively laminated, wherein, when the surface of the resin coating layer of the coated metal material is cut to mark an X shape with a knife that reaches the metal material and the coated metal material is subjected to a salt water spray treatment defined in JIS Z 2371, the maximum swelling width of the resin coating layer after 360 hours of the treatment is not more than 5 mm.

(27) The coated metal material of (26) above, wherein the metal material is plated.

(28) The coated metal material of (26) above, wherein the surface treatment layer has a thickness of not more than 3 μm.

(29) The coated metal material of (26) above, wherein the surface treatment layer is formed with the agent for treating metallic surface of any of (1)–(24) above.

(30) The coated metal material of (26) above, wherein the maximum swelling width of the resin coating layer is not more than 3 mm.

(31) A surface-treated metal material comprising a metal material and a chromium-free surface treatment layer having a thickness of not more than 5 µm formed on the metal material, wherein, when the surface-treated metal material is subjected to a salt water spray treatment defined in JIS Z 2371, the surface treatment layer has a residual Si percentage as represented by the following formula after 360 hours of the treatment of not less than 0.5 and/or a residual P percentage as represented by the following formula after 360 hours of the treatment of not less than 0.5:

Residual Si percentage of the surface treatment layer=Si content of the surface treatment layer after 360 hours of the treatment/Si content of the surface treatment layer before the treatment Residual P percentage of the surface treatment layer=P content of the surface treatment layer after 360 hours of the treatment/P content of the surface treatment layer before the treatment

(32) The surface-treated metal material of (31) above, wherein the residual Si percentage is not less than 0.6.

(33) The surface-treated metal material of (31) above, wherein the residual P percentage is not less than 0.6.

(34) The surface-treated metal material of (31) above, wherein the surface treatment layer is formed with the agent for treating metallic surface of any of (1)–(24) above.

(35) A surface-treated metal material comprising a metal material and a chromium-free surface treatment layer having a thickness of not more than 5 µm formed on the metal material, wherein, when the surface-treated metal material is subjected to a salt water spray treatment defined in JIS Z 2371, the surface treatment layer has a residual Al percentage as represented by the following formula after 360 hours of the treatment of not less than 0.5:

Residual Al percentage of the surface treatment layer=Al content of the surface treatment layer after 360 hours of the treatment/Al content of the surface treatment layer before the treatment.

(36) The surface-treated metal material of (35) above, wherein the residual Al percentage is not less than 0.6.

(37) The surface-treated metal material of (35) above, wherein the surface treatment layer is formed with the agent for treating metallic surface of any of (1)–(24) above.

DETAILED DESCRIPTION OF THE INVENTION

In the coated metal material and surface-treated metal material of the present invention, for example, the agent for treating metallic surface of the present invention is applied to various metal materials, such as a cold draw steel plate and Zn or Zn alloy-plated steel plate, to form a surface treatment layer. The surface treatment layer thus formed is ensured to have extremely superior adhesive property to various metal materials, superior resistance to corrosion in an unpainted state (hereinafter to be referred to as naked resistance to corrosion) after processing and superior adhesion to various organic resins (adhesion to a paint). It is preferable to contain an organic resin to achieve these superior adhesive properties. Such superior adhesive property is secured by a combination of an organic resin; a mixture of an aluminum salt and an inorganic oxide particle, and/or an aluminum-containing inorganic oxide particle comprising aluminum, oxygen and at least one element other than these two (hereinafter to be simply referred to as aluminum-containing inorganic oxide particle); a salt of a metal other than aluminum; and a phosphorus compound. The presence of an inorganic oxide particle such as colloidal silica and the like and an aluminum-containing inorganic oxide particle such as aluminum surface-treated colloidal silica and the like in a surface treatment layer is preferable to secure extremely superior naked corrosion resistance. These components interact with an organic resin, an aluminum salt, a salt of a metal other than aluminum and a phosphorus compound in the surface treatment layer, which in turn prevents ommission of the constituent component from the surface treatment layer and ultimately leads to an improved corrosion resistance in an unpainted state.

The agent for treating metallic surface that is usable for obtaining the coated metal material and the surface-treated metal material of the present invention is explained in the following.

The agent for treating metallic surface of the present invention contains, as constituent components, a mixture of an aluminum salt and an inorganic oxide particle, and/or an aluminum-containing inorganic oxide particle; a salt of a metal other than aluminum; a phosphorus compound; and a resin and/or a precursor thereof, and is free of chromium.

In the present invention, the resin and/or the precursor thereof fix(es) a mixture of an aluminum salt and an inorganic oxide particle, and/or an aluminum-containing inorganic oxide particle; a salt of a metal other than aluminum; a phosphorus compound; and components other than the solvent in an agent for treating metallic surface as a strong film on the surface of the metal material. In accordance with the present invention, the resin is not particularly limited and has a molecular weight of not less than 1000, preferably not less than 1500, and more preferably not less than 2000. In the present invention, the precursor thereof means a compound capable of forming a resin-coating layer on the surface of the metal material by causing a reaction by standing, using heat, electromagnetic wave and the like after attaching to the surface, though it does not have a molecular weight that qualifies itself to be called a resin. Specific examples thereof are monomers and oligomers of various resins.

In the present invention, the content of the resin and/or the precursor thereof is preferably 30–80 wt %, more preferably 40–80 wt %, of the whole constituent components of the agent for treating metallic surface.

The resin is exemplified by polymerization type resin, condensation polymerization type resin, addition polymerization type resin, cellulose resin, natural rubber, polysiloxane and the like.

Examples of the polymerization type resin include polymers of a double bond-containing compound such as polyacrylate and copolmer thereof, polymethacrylate and copolmer thereof, polystyrene and copolmer thereof, poly (vinyl acetate) and copolmer thereof, polyacrylonitrile and copolmer thereof, poly(vinyl chloride) and copolmer thereof, poly(vinylpyrrolidone) and copolmer thereof, polybutadiene and copolmer thereof, polyisoprene and copolmer thereof, polyneoprene and copolmer thereof, polyethylene and copolmer thereof and polypropylene and copolmer thereof; and ring opening-polymerization type resins such as poly(ethylene oxide) and copolmer thereof, poly(propylene oxide) and copolmer thereof, poly (tetramethylene oxide) and copolmer thereof and poly (ethylene imine) and copolmer thereof. The precursor thereof is exemplified by monomer and oligomer for these resins.

The condensation polymerization type resin includes polyester, polyamide, polyimide, polycarbonate, copolymer thereof and the like, and the precursor thereof is exemplified by monomer and oligomer for these resins. The addition polymerization type resin includes epoxy resin, urethane resin, polyether resin and the like. The precursor thereof includes epoxy compound, isocyanate compound, a block compound thereof and the like. In addition, modified resins, such as polyester polyamide, urethane-modified polyester, epoxy-modified polyester and the like, can be also used.

These resins and/or the precursors thereof that are cured with a phenolic resin, amino resin, epoxy compound, isocyanate compound and the like, after attaching to the surface of the metal material, naturally fall under the category of the resin and/or the precursor thereof in the present invention.

In the present invention, the resin and/or the precursor thereof are/is contained in the form of a solution or dispersion in a solvent. The solvent may be an organic solvent or aqueous solvent. In general terms, however, an aqueous solvent is often used, so that the resin can be preferably dissolved or dispersed in water.

For a resin and/or a precursor thereof to be dissolved in an aqueous solvent, a hydrophilic functional group such as hydroxyl group, carboxyl group, sulfonic acid group, phosphoric acid group, salts thereof, ether group and the like is introduced into the resin and/or the precursor thereof. For a resin and/or a precursor thereof to be dispersed in an aqueous solvent, the above-mentioned functional group is introduced or a surfactant is added. A method for introducing a functional group into a resin and/or a precursor thereof is exemplified by, but not limited to, a general method including a method wherein a monomer having each functional group is used, a method wherein introduction follows synthesis of the resin, and the like.

A method for dissolution or dispersion of the resin and/or the precursor thereof in an aqueous solvent may be a known method such as direct dissolution or dispersion of a resin and/or a precursor thereof in water or hot water; dissolution in a water-compatible organic solvent, followed by addition of water; emulsion polymerization of polymerization type resin and the like.

Of these resins, acrylic resin, polyester resin, epoxy resin, acryl-epoxy resin, acryl-modified polyester resin, epoxy-modified polyester resin, urethane-modified polyester resin, acryl-modified polyurethane resin and acryl-modified polyester polyurethane resin are preferable. As the precursor of a resin, precursors of acrylic resin, polyester resin, epoxy resin, acryl-epoxy resin, acryl-modified polyester resin, epoxy-modified polyester resin, urethane-modified polyester resin, acryl-modified polyurethane resin and acryl-modified polyester polyurethane resin and the like are preferable.

In the present invention, the acrylic resin is more preferably a resin made from a hydroxy group-containing acrylic monomer alone, a resin obtained by copolymerization of a hydroxy group-containing acrylic monomer and other organic monomer and a resin obtained by binding a polymer made from these monomers to a different resin.

Examples of the hydroxy group-containing acrylic monomer component include hydroxy group-containing monomers such as hydroxyalkyl (meth)acrylates [e.g., hydroxyethyl (meth)acrylate, hydroxypropyl (meth)acrylate, 3-hydroxybutyl (meth)acrylate, 2,2-bis(hydroxymethyl) ethyl acrylate, 2,3-dihydroxypropyl (meth)acrylate, 3-chloro-2-hydroxypropyl (meth)acrylate and the like], allyl alcohols and N-methylolacrylamides; monomers having a glycidyl group such as glycidyl (meth)acrylate, allyl glycidyl ether, β-methylglycidyl (meth)acrylate, 3,4-epoxycyclohexylmethyl (meth)acrylate and the like, which is expected to have a reactivity similar to that of hydroxyl group in an acidic liquid; monomers having an aldehyde group such as acroleinamide, which is expected to have a reactivity similar to that of hydroxyl group in an acidic liquid; and the like, with particular preference given to 2-hydroxyethyl acrylate and 2-hydroxyethyl methacrylate. The "(meth)acrylate" means "methacrylate and/or acrylate".

It is preferable to use one or two from unsaturated ethylene carboxylic acid and other unsaturated ethylene compound simultaneously as other organic monomer. Examples of the unsaturated ethylene carboxylic acid include unsaturated ethylene monocarboxylic acids such as acrylic acid, methacrylic acid, crotonic acid and the like; unsaturated ethylene dicarboxylic acids such as itaconic acid, maleic acid, fumaric acid and the like; and alkaline metal salts, ammonium salts and organic amine salts of these carboxylic acids. Other unsaturated ethylene compound includes unsaturated ethylene compounds other than the above-mentioned unsaturated ethylene carboxylic acids and the above-mentioned hydroxyl group-containing monomers, which is, for example, akyl (meth)acrylate and other vinyl compounds such as aromatic vinyl compound and the like.

The resin to bind the polymer made from these monomers include the above-mentioned polymerization type resin, condensation polymerization type resin, addition polymerization type resin, cellulose resin, natural rubber, polysiloxane and the like.

The method for binding the polymer made from the above-mentioned monomers to the resin includes a method by graft polymerization wherein a functional group capable of radical polymerization with the above-mentioned monomer is introduced into the resin or a radical is generated in the resin and then the above-mentioned monomers are polymerized in the presence of the resin; a method wherein the functional group introduced into the polymer of the above-mentioned monomer and the functional group in the resin are directly reacted; and a method wherein the functional group introduced into the polymer of the above-mentioned monomers and the functional group in the resin are bonded via an isocyanate compound, epoxy compound and the like.

In the present invention, moreover, the polyester resin is obtained by reacting a dicarboxylic acid component and a glycol component. The aromatic dicarboxylic acid is exemplified by terephthalic acid, isophthalic acid, orthophthalic acid, naphthalenedicarboxylic acid, biphenyldicarboxylic acid, sodium sulfonatoisophthalic acid and the like. The aliphatic dicarboxylic acid is exemplified by succinic acid, adippic acid, azelaic acid, sebacic acid, dodecanedicarboxylic acid, dimer acid and the like, and the alicyclic dicarboxylic acid is exemplified by 1,4-cyclohexanedicarboxylic acid, 1,3-cyclohexanedicarboxylic acid, 1,2-cyclohexanedicarboxylic acid and acid anhydride thereof and the like. With regard to the unsaturated double bond-containing dicarboxylic acid, α, β-unsaturated dicarboxylic acid is exemplified by fumaric acid, maleic acid, maleic anhydride, itaconic acid and citraconic acid, and unsaturated double bond-containing alicyclic dicarboxylic acid is exemplified by 2,5-norbornenedicarboxylic anhydride, tetrahydrophthalic anhydride and the like. Moreover, hydroxycarboxylic acids such as p-hydroxybenzoic acid, p-(2-hydroxyethoxy)benzoic acid, hydroxypivalic acid, γ-butyrolactone, ε-caprolactone and the like can be used as necessary. In the preferable composition, a dicarboxylic acid component consists of 50–100 mol % of the aromatic dicarboxylic acid, and 0–50 mol % of aliphatic and/or alicyclic dicarboxylic acid. In the present invention, a polyester resin having an acid anhydride, such as maleic anhydride, trimellitic anhydride and the like attached to the molecular terminal, can be used.

The glycol component consists of aliphatic glycol having 2 to 10 carbon atoms and/or alicyclic gylcol having 6 to 12 carbon atoms and/or ether bond-containing glycol and/or unsaturated bond-containing gylcol. The aliphatic glycol having 2 to 10 carbon atoms may be, for example, ethylene glycol, 1,2-propylene gylcol, 1,3-propanediol, 1,4-butanediol, 1,5-pentanediol, neopentyl gylcol, 1,6-hexanediol, 3-methyl-1,5-pentanediol, 1,9-nonanediol, 2-ethyl-2-butylpropanediol, hydroxypivalic acid neopentyl gylcol ester, dimethylolheptane and the like, and the alicyclic gylcol having 6 to 12 carbon atoms may be, for example, 1,4-cyclohexanedimethanol, tricyclodecanedimethylol and the like.

The ether bond-containing gylcol is exemplified by diethylene gylcol, triethylene gylcol, dipropylene gylcol, and gycols obtained by adding one to several moles of ethylene oxide or propylene oxide to bisphenol having two phenolic hydroxyl groups, such as 2,2-bis(4-hydroxyethoxyphenyl) propane and the like. In addition, polyethylene glycol, polypropylene glycol and polytetramethylene gylcol can be used as necessary.

The unsaturated bond-containing gylcol is exemplified by glycerol monoallyl ether, trimethylolpropane monoallyl ether, pentaerythritol monoallyl ether and the like.

The polyester resin to be used in the present invention can be copolymerized with a polycarboxylic acid and/or polyol having 3 or more carboxyl groups in a proportion of 0–5 mol %. Examples of the polycarboxylic acid having 3 or more carboxyl groups include (anhydrous) trimellitic acid, (anhydrous) pyromellitic acid, (anhydrous) benzophenonetetracarboxylic acid, trimesic acid, ethylene gylcol bis(anhydrous trimellitate), glycerol tris(anhydrous trimellitate) and the like. As the polyol having 3 or more hydroxyl groups, glycerol, trimethylolethane, trimethylolpropane, pentaerythritol and the like can be used. The polycarboxylic acid and/or polyol are/is copolymerized in a proportion of 0–5 mol %, preferably 0–3 mol %, of the total acid component or total glycol component, wherein a proportion of more than 5 mol % results in insufficient processability.

For the polyester resin to be dissolved or dispersed in an aqueous solvent, at least one of dicarboxylic acid component and the gylcol component containing the above-mentioned hydrophilic group is copolymerized.

The hydrophilic group-containing dicarboxylic acid is exemplified by sulfonic acid group-containing polycarboxylic acid and derivatives thereof such as sodium 5-sulfonatoisophthalic acid, tetrabutylphosphonium 5-sulfonatoisophthalic acid, sodium sulfonatosuccinic acid and the like, and phosphoric acid group-containing polycarboxylic acid, such as methyl-2,3-dicarboxypropylphosphoric acid and the like.

The hydrophilic group-containing gylcol is exemplified by sulfonic acid group-containing gylcols and derivatives thereof such as alkylene oxide adduct with sodium 5-sulfonatoisophthalic acid, tetrabutylphosphonium 5-sulfonatoisophthalic acid, sodium sulfonatosuccinic acid and the like, sodium sulfobisphenol A, 2-sodiumsulfo-1,4-butanediol and the like; and phosphoric acid group-containing gylcols and derivatives thereof such as sodium bis(hydroxymethyl)phosphate, sodium bis(2-hydroxyethoxymethyl)phosphate and the like. As the hydrophilic group-containing gylcol, polyethylene gylcol having a molecular weight of not less than 100 can be also used. Of these, particularly preferred is sodium 5-sulfonatoisophthalic acid.

Moreover, a method for dissolving or dispersing a polyester resin in an aqueous solvent may be an addition of trimellitic anhydride or pyromellitic anhydride to the molecular end of polyester.

In the present invention, the polyurethane resin comprises polyol (a), an organic diisocyanate compound (b), and a chain extender (c) having an active hydrogen group as necessary. The polyol (a) can be various polyols such as polester polyol, polyether polyol, polycarbonate polyol, polyolefin polyol and the like, as well as epoxy resin, phenoxy resin, cellulose resin, phenolic resin, butyral resin and the like. One or more kinds therefrom can be used. Preferred polyol is polester polyol containing aromatic dicarboxylic acid as a dicarboxylic acid component, with more preference given to polester polyol containing, as a dicarboxylic acid component, aromatic dicarboxylic acid in a proportion of 30–100 mol % and aliphatic and/or alicyclic dicarboxylic acid in a proportion of 0–40 mole %. This polyester polyol is preferably contained in a proportion of 50–100 wt % of the entire polyol component.

Examples of the organic diisocyanate compound(b) include hexamethylene diisocyanate, tetramethylene diisocyanate, 3,3'-dimethoxy-4,4'-biphenylene diisocyanate, p-xylylene diisocyanate, m-xylylene diisocyanate, 1,3-diisocyanatomethylcyclohexane, 4,4'-diisocyanatodicyclohexane, 4,4'-diisocyanatocyclohexylmethane, isophorone diisocyanate, 2,4-tolylene diisocyanate, 2,6-tolylene diisocyanate, p-phenylene diisocyanate, diphenylmethane diisocyanate, m-phenylene diisocyanate, 2,4-naphthalene diisocyanate,3, 3'-dimethyl-4,4'-biphenylene diisocyanate, 4,4'-diisocyanatodiphenyl ether, 1,5-naphthalene diisocyanate and the like.

The chain extender (c) having an active hydrogen group to be used as necessary includes, for example, gylcols such as ethylene gylcol, propylene gylcol, neopentyl gylcol, 2,2-diethyl-1,3-propanediol, diethylene gylcol, spiro gylcol, polyethylene gylcol and the like; amines such as hexamethylenediamine, propylenediamine and the like. In addition, a compound having two or more active hydrogen groups and different functional group, such as dimethylolpropionic acid and the like can be also used.

The polyurethane resin to be used in the present invention is preferably a polyurethane resin obtained by reacting polyol (a), organic diisocyanate compound (b) and chain extender (c) having an active hydrogen group as necessary in a proportion of active hydrogen group of (a)+(c)/ isocyanato group of 0.4–1.3 (equivalent ratio).

The polyurethane resin can contain an unsaturated bond in the above-mentioned (a), (b) and (c). When an unsaturated bond is contained in (c), for example, gylcols such as glycerol monoallyl ether, glycerol monomethacrylate and the like can be used.

The polyurethane resin to be used in the present invention can be prepared by a known method in a solvent at a reaction temperature of 20–150° C. in the presence or absence of a catalyst. The solvent to be used here is exemplified by ketones such as methyl ethyl ketone, methyl isobutyl ketone, cyclohexanone and the like; aromatic hydrocarbones such as toluene, xylene and the like; esters such as ethyl acetate, butyl acetate and the like. The catalyst used for accelerating the reaction may be amines, organic tin compound and the like.

A method for dissolution or dispersion of polyurethane resin in an aqueous solvent includes a method wherein polyol capable of dissolution or dispersion in an aqueous solvent is used as polyol (a) (specifically, the above-mentioned polyester capable of dissolution or dispersion in an aqueous solvent is used or polyethylene gylcol having a molecular weight of not less than 100 is used); a method wherein the hydrophilic group-containing chain extender is used as the chain extender (c).

The hydrophilic group-containing chain extender is the hydrophilic group-containing gylcols as explained for the the above-mentioned polyester resin; oxybenzoic acids such as glyceric acid, dimethylolpropionic acid, N,N-diethanolglycine, hydroxyethyloxybenzoic acid and the like; aminocarboxylic acids and derivatives thereof, such as diaminopropionic acid, diaminobenzoic acid and the like.

A different method include, when producing polyurethane, use of an excess of isocyanate compound to give polyurethane having an isocyanate terminal, and reaction with polyhydric alcohol compound. As the polyhydric alcohol compound, glycerol, trimethylolethane, trimethylolpropane, pentaeiythritol and the like can be used.

In the present invention, moreover, the epoxy resin is an epoxy compound per se having plural epoxy groups in a molecule, or a reaction product of an epoxy compound and a compound having plural groups capable of reacting with epoxy group, such as hydroxyl group, mercapto group, carboxyl group, acid anhydride, amino group and the like. As the epoxy compound, epoxy compound obtained from divalent alcohols, divalent phenols, hydrogenation product or halogenation product of these phenols, or novolacs (reaction product of polyhydric phenols and aldehydes such as formaldehyde and the like in the presence of an acidic catalyst), and a modified compound thereof with acid such as fatty acid, which may be used alone or in combination, with preference given to bisphenol A type epoxy compound, hydrogenated bisphenol A type epoxy compound, bisphenol F type epoxy compound and modified compound thereof and the like.

The above-mentioned polyester resin can be reacted with epoxy compound after affording an acid terminal as necessary, to give an epoxy-modified polyester resin, which can be used in the same manner.

In addition, an unsaturated bond can be introduced by reacting an unsaturated compound such as an unsaturated acid compound, unsaturated amine compound and the like, having a functional group having high reactivity with epoxy group and hydroxyl group in the epoxy resin, with epoxy resin. Examples of the unsaturated acid compound include acrylic acid, methacrylic acid, fumaric acid, maleic acid and anhydride thereof, itaconic acid and anhydride thereof, acid phosphooxyethyl (meth)acrylate (trademark Phosmer M and the like, manufactured by UNICHEMICAL CO., LTD.) and the like, and as the unsaturated amine compound, aminoethyl acrylate, aminoethyl methacrylate and the like can be used. In this case, the reaction may proceed in the presence of various catalysts such as pyridine and the like. In the case of an epoxy-modified polyester resin, an unsaturated group can be introduced into polyester in advance.

A method for dissolution or dispersion of the epoxy resin in an aqueous solvent, includes a method wherein hydrophilic group-containing polyhydric carboxylic acids or polyhydric gylcols described above with reference to the above-mentioned polyester resin, is used as the reaction mate of the epoxy compound; a method wherein aminocarboxylic acids such as diaminopropionic acid, diaminobenzoic acid and the like or derivatives thereof and the like, is used as the reaction mate of the epoxy compound. In the case of an epoxy-modified polyester resin, as the polyester resin, the above-mentioned polyester resin capable of dissolution or dispersion in an aqueous solvent may be used. Alternatively, an excess epoxy group compound is used to give an epoxy resin having epoxy terminal and reacted with polycarboxylic acid compound to give a resin having carboxylic acid terminal, which may be neutralized to give a salt on demand. The polycarboxylic acid compound to be used here include trimellitic acid, pyromellitic acid, benzophenonetetracarboxylic acid, trimesic acid, ethylene gylcol bis(anhydruos trimellitate), glycerol tris(anhydruos trimellitate) and the like.

In the present invention, the acryl-modified polyester resin comprises polyester resin (A) having $5-1000$ mol/$10^6$ g of unsaturated bond and a weight average molecular weight of 1000–100000 and resin (B) obtained from the mixture of unsaturated monomer, the resin (A) and resin (B) chemically bound, wherein resin (B) comprises unsaturated monomer (B-1) that can dissolve polyester resin (A) at a temperature not more than 150° C., water soluble unsaturated monomer (B-2) having a functional group such as hydroxyl group and the like, and ionic unsaturated monomer (B-3) neutralized with an acid or a base.

Each item is explained in the following.

Polyester resin (A)

The polyester resin (A) in the present invention has an unsaturated bond in a molecule and has a weight average molecular weight of 1000–100000, and constitutes the main chain of the graft polymer. The unsaturated bond in a molecule is preferably $5-1000$ mol/$10^6$ g. When it is less than 5 mol/$10^6$ g, sufficient grafting is unfeasible and therefore, effect by acryl modification is hardly seen, whereas when it exceeds 1000 mol/$10^6$ g, the polyester shows undesirable gellation and the like during grafting.

When unsaturated bond is introduced, a dicarboxylic acid and a gylcol having an unsaturated bond can be used, as mentioned above. In addition, unsaturated compound having a functional group reactive with carboxyl group and hydroxyl group at the polyester terminal can be reacted for the introduction. For example, epoxy group-containing unsaturated monomers such as glycidyl methacrylate and the like; isocyanato group-containing unsaturated monomers such as methacryloyl isocyanate and the like; unsaturated acid anhydrides such as maleic anhydride and the like; and the like can be used.

The dicarboxylic acid and gylcol to be used as a component of the polyester resin (A) is similar to that in the above-mentioned polyester resin, wherein the most preferable monomer for the introduction of a double bond is fumaric acid, maleic acid, itaconic acid and 2,5-norbornenedicarboxylic anhydride.

Resin (B)

The resin (B) comprises unsaturated monomer (B-1) that can dissolve polyester resin (A) at a temperature not more than 150° C., water soluble unsaturated monomer (B-2) having a functional group such as hydroxyl group and the like, and ionic unsaturated monomer (B-3) neutralized with an acid or a base.

The unsaturated monomer (B-1) that can dissolve polyester resin (A) at a temperature not more than 150° C. improves compatibility of polyester resin (A) and resin (B) in the coating. The unsaturated monomer that can dissolve polyester resin (A) at a temperature not more than 150° C. is an unsaturated monomer capable of dissolving polyester resin (A) at a temperature not more than 150° C. upon addition of 200 parts by weight per 100 parts by weight of polyester resin (A). As a rough criteria of the dissolution property, the unsaturated structure to aromatic solvent, ester solvent, ketone solvent, ether solvent and the mixed solvent thereof, which is capable of dissolving polyester resin (A). They are exemplified in the following.

unsaturated monomer having a structure similar to aromatic solvent in wide use: styrene, styrene derivatives;

unsaturated monomer having a structure similar to ester solvent in wide use: lower alkyl (meth)acrylates, vinyl esters;

unsaturated monomer having a structure similar to ether solvent in wide use: vinyl ethers, (meth)acrylic acid gylcol ether esters;

unsaturated monomer having a structure similar to other solvent: N,N-dimethylacrylamide, vinylpyridine, vinylprrolidone, acryloylmorpholine and the like.

One or more kinds from these unsaturated monomers can be used. Of these, preferred are styrene and derivatives thereof and alkyl (meth)acrylates having 1 to 6 carbon atoms, and more preferred are a mixture of styrene or derivatives thereof and alkyl (meth)acrylates having 1 to 6 carbon atoms.

The water soluble unsaturated monomer (B-2) having a functional group such as hydroxyl group and the like imparts curability and adhesive property to the coating due to the functional group. The water soluble unsaturated monomer having a functional group such as hydroxyl group and the like is a known unsaturated monomer. Being water soluble means the capability of being dissolved completely in water at any proportion at a temperature of not more than 100° C. Such monomer is exemplified in the following.

hydroxyl group-containing unsaturated monomer: 2-hydroxyethyl (meth)acrylate, 2-hydroxypropyl (meth)acrylate, 4-hydroxybutyl (meth)acrylate, diethylene gylcol mono(meth)acrylate, dipropylene gylcol mono(meth)acrylate, glycerol mono(meth)acrylate, allyl alcohol, glycerol monoallyl ether, N-methylol(meth)acrylamide and the like.

carboxyl group-containing unsaturated monomer: acrylic acid, methacrylic acid and the like.

amino group-containing unsaturated monomer: N,N-dimethyl(meth)acrylanide and the like.

One or more kinds from these unsaturated monomers in admixture can be used. Preferred are one or more hydroxyl group-containing unsaturated monomer(s), a mixture of one or more hydroxyl group-containing unsaturated monomer(s) and one or more carboxyl group-containing unsaturated monomer(s), and a mixture of one or more hydroxyl group-containing unsaturated monomer(s) and one or more amino group-containing unsaturated monomer(s). The proportion of the hydroxyl group-containing unsaturated monomer in the unsaturated monomer (B-2) is preferably not less than 30 wt %.

The ionic unsaturated monomer (B-3) neutralized with an acid or a base facilitates meeting of the polymer of the unsaturated monomer mixture in a coating and effective for improving curing efficiency and suppressing degradation of adhesive property. When it is contained in an excess, however, it causes low water resistance, so that it is desirable to keep it to the minimum level. Examples of these unsaturated monomer include unsaturated carboxylic acid compounds, unsaturated phosphoric acid compounds and unsaturated sulfonic acid compounds neutralized with a base, quaternary ammonium group-containing unsaturated monomers and the like. Specific examples include alkaline metal salt, ammonium salt and organic amine salt of (meth)acrylic acid; sodium styrenesulfonate; alkaline metal salt, ammonium salt and organic amine salt of acid phosphoxyethyl (meth)acrylate (trademark Phosmer M etc., manufactured by UNICHEMICAL CO., LTD.); alkali metal salt, ammonium salt and organic amine salt of acrylamidomethylpropanesulfonic acid; (meth)acryloyloxyethyl trimethyl ammonium chloride; (meth)acryloyloxyethyl triethyl ammonium chloride; (meth)acryloyloxyethyl trimethyl ammonium sulfate; (meth)acryloyloxyethyl triethyl ammonium sulfate; (meth)acryloyloxyethyl trimethyl ammonium phosphate; (meth)acryloyloxyethyl triethyl ammonium phosphate; acetate, hydrochloride, phosphate and sulfate of N,N-dimethylaminoethyl (meth)acrylate; acetate, hydrochloride, phosphate and sulfate of N,N-diethylaminoethyl acrylate, and the like, with preference given to unsaturated monomers of strong acid and strong base, such as sodium styrenesulfonate. The unsaturated monomer (B-3) may be converted to alkaline metal salt, ammonium salt or organic amine salt after polymerization.

As the resin (B), various other known unsaturated monomers inclusive of multifunctional unsaturated monomers can be used as necessary. Examples of various unsaturated monomer include various vinyl compounds, vinyl ester compounds, vinyl ether compounds, (metha)acrylates and the like. They enable adjusting/imparting of solvent dissolution property, Tg, other reactivity and the like of resin (B). The multifunctional unsaturated monomer is exemplified by ethylene gylcol di(meth)acrylate, diethylene gylcol di(meth)acrylate and the like.

The resin (B) comprises unsaturated monomer (B-1) that can dissolve polyester resin (A) at a temperature not more than 150° C., water soluble unsaturated monomer (B-2) having a functional group such as hydroxyl group and the like, and ionic unsaturated monomer (B-3) neutralized with an acid or a base. Supposing the weight of polyester resin (A) is X, the weight of resin (B) is Y, the weight ratio (Y/X) of resin (B)/polyester resin (A) is preferably within the range of 1/99–90/10, more preferably 10/90–80/20. When polyester resin (A) is contained in a smaller ratio, the characteristic property of polyester resin (A) is difficult to be exerted and when it is contained in a larger ratio, the effect of improving curability becomes less.

Supposing the weight of unsaturated monomer (B-1) that can dissolve polyester resin (A) at a temperature not more than 150° C. is Y1, the weight of water soluble unsaturated monomer (B-2) having a functional group such as hydroxyl group and the like is Y2, and the weight of ionic unsaturated monomer (b-3) neutralized with an acid or a base is Y3, the relationship as expressed by $0.6 \leq (Y1+Y2+Y3)/Y \leq 1.0$ preferably exists. When (Y1+Y2+Y3)/Y is smaller than this range, the effect of improving curability becomes less. As to the unsaturated monomer (B-1), $0.005 \leq Y1/X$ and $0.3 \leq Y1/Y \leq 0.7$ are preferable, and when Y1/X or Y1/Y is smaller than this range, compatibility cannot be imparted easily. As to the saturated monomer (B-2), $0.005 \leq Y2/X$ and $0.3 \leq Y2/Y \leq 0.7$ are preferable, and when Y2/X or Y2/Y is smaller than this range, curability becomes less. As to the unsaturated monomer (B-3), $Y3/X \leq 0.05$ and $0.0001 \leq Y3/Y \leq 0.1$ are preferable, when Y3/X or Y3/Y is greater than this range, water resistance and the like becomes undesirably poor.

In the present invention, the acryl-modified polyurethane resin is obtained by the use of double bond-containing polyurethane resin instead of the above-mentioned double bond-containing polyester resin (A). In the polyurethane resin, double bond-containing glycerines such as glycerine monoallyl ether, trimethylolpropane monoallyl ether, pentaerythritol monoallyl ether and the like can be used.

In the present invention, acryl-modified polyester polyurethane resin is obtained by the use of double bond-containing polyester polyurethane resin instead of the above-mentioned double bond-containing polyester resin (A). Other is the same as in the acryl-modified polyester.

The aluminum salt in the present invention includes, for example, compounds such as aluminum phosphate, aluminum monohydrogenphosphate, aluminum dihydrogenphosphate, aluminum acetate, aluminum formate, aluminum nitrate, aluminum sulfate, aluminum chloride, aluminum bromide, aluminum fluoride, aluminum oxalate, aluminum nitrite, aluminum sulfite, aluminum hydrogensulfite, aluminum silicate, aluminum bioxalate, aluminum bifluoride, aluminum carbonate, aluminum hydrogencarbonate, aluminum hydrogensulfate, aluminum hydroxide, aluminum polyphosphate, aluminum hypophosphite, aluminum tripolyphosphate, aluminum hexametaphosphate, aluminum polymetaphosphate, aluminum phosphonate and the like, with particular preferance given to aluminum phosphate, aluminum monohydrogenphosphate, aluminum dihydrogenphosphate. An aluminum compound capable of converting to an aluminum salt in the agent for treating metallic surface containing solvent may be used even if it is not an aluminum salt. These aluminum salts is preferably capable of dissolving in a solvent to be used for the agent for treating metallic surface.

The salt of the metal other than aluminum of the present invention is preferably a salt of a polyvalent metal, and the metal other than aluminum is exemplified by Cu, Co, Fe, Mn, Sn, V, Ba, Mg, Zr, W, Mo, Ca, Sr, Nb, Y and Zn, with preference given to Mn, Mg, Zr, W, Mo, Ca and Sr. The most preferred is Mn. The salt may be phosphate, monohydrogenphosphate, dihydrogenphosphate, acetate, formate, nitrate, sulfate, chloride, bromide, fluoride, oxalate, nitrite, sulfite, hydrogensulfite, silicate, bioxalate, bifluoride, carbonate, hydrogencarbonate, hydrogensulfate, hydroxide, polyphosphate, hypophosphite, tripolyphosphate, hexametaphosphate, polymetaphosphate, phosphonate and the like, with preference given to phosphate, monohydrogenphosphate and dihydrogenphosphate. A compound capable of converting to a salt in the agent for treating metallic surface containing solvent may be used even if it is not a salt. These salts is preferably capable of dissolving in a solvent to be used for the agent for treating metallic surface.

With regard to the salt of the metal other than aluminum of the present invention, its phosphate compound is exemplarly shown in the following.

Copper phosphate, cobalt phosphate, iron phosphate, manganese phosphate, tin phosphate, vanadium phosphate, barium phosphate, magnesium phosphate, zirconium phosphate, tungsten phosphate, molybdenum phosphate, calcium phosphate, strontium phosphate, niobium phosphate, yttrium phosphate, zinc phosphate;

copper monohydrogenphosphate, cobalt monohydrogenphosphate, iron monohydrogenphosphate, manganese monohydrogenphosphate, tin monohydrogenphosphate, vanadium monohydrogenphosphate, barium monohydrogenphosphate, magnesium monohydrogenphosphate, zirconium monohydrogenphosphate, tungsten monohydrogenphosphate, molybdenum monohydrogenphosphate, calcium monohydrogenphosphate, strontium monohydrogenphosphate, niobium monohydrogenphosphate, yttrium monohydrogenphosphate, zinc monohydrogenphosphate;

copper dihydrogenphosphate, cobalt dihydrogenphosphate, iron dihydrogenphosphate, manganese dihydrogenphosphate, tin dihydrogenphosphate, vanadium dihydrogenphosphate, barium dihydrogenphosphate, magnesium dihydrogenphosphate, zirconium dihydrogenphosphate, tungsten dihydrogenphosphate, molybdenum dihydrogenphosphate, calcium dihydrogenphosphate, strontium dihydrogenphosphate, niobium dihydrogenphosphate, yttrium dihydrogenphosphate, zinc dihydrogenphosphate;

copper polyphosphate, cobalt poyphosphate, iron polyphosphate, manganese polyphosphate, tin polyphosphate, vanadium polyphosphate, barium polyphosphate, magnesium polyphosphate, zirconium polyphosphate, tungsten polyphosphate, molybdenum polyphosphate, calcium polyphosphate, strontium polyphosphate, niobium polyphosphate, yttrium polyphosphate, zinc polyphosphate;

copper hypophosphite, cobalt hypophosphite, iron hypophosphite, manganese hypophosphite, tin hypophosphite, vanadium hypophosphite, barium hypophosphite, magnesium hypophosphite, zirconium hypophosphite, tungsten hypophosphite, molybdenum hypophosphite, calcium hypophosphite, strontium hypophosphite, niobium hypophosphite, yttrium hypophosphite, zinc hypophosphite;

copper tripolyphosphate, cobalt tripolyphosphate, iron tripolyphosphate, manganese tripolyphosphate, tin tripolyphosphate, vanadium tripolyphosphate, barium tripolyphosphate, magnesium tripolyphosphate, zirconium tripolyphosphate, tungsten tripolyphosphate, molybdenum tripolyphosphate, calcium tripolyphosphate, strontium tripolyphosphate, niobium tripolyphosphate, yttrium tripolyphosphate, zinc tripolyphosphate;

copper hexametaphosphate, cobalt hexametaphosphate, iron hexametaphosphate, manganese hexametaphosphate, tin hexametaphosphate, vanadium hexametaphosphate, barium hexametaphosphate, magnesium hexametaphosphate, zirconium hexametaphosphate, tungsten hexametaphosphate, molybdenum hexametaphosphate, calcium hexametaphosphate, strontium hexametaphosphate, niobium hexametaphosphate, yttrium hexametaphosphate, zinc hexametaphosphate;

copper polymetaphosphate, cobalt polymetaphosphate, iron polymetaphosphate, manganese polymetaphosphate, tin polymetaphosphate, vanadium polymetaphosphate, barium polymetaphosphate, magnesium polymetaphosphate, zirconium polymetaphosphate, tungsten polymetaphosphate, molybdenum polymetaphosphate, calcium polymetaphosphate, strontium polymetaphosphate, niobium polymetaphosphate, yttrium polymetaphosphate, zinc polymetaphosphate;

copper phosphonate, cobalt phosphonate, iron phosphonate, manganese phosphonate, tin phosphonate, vanadium phosphonate, barium phosphonate, magnesium phosphonate, zirconium phosphonate, tungsten phosphonate, molybdenum phosphonate, calcium phosphonate, strontium phosphonate, niobium phosphonate, yttrium phosphonate, zinc phosphonate, and the like.

The aluminum salt content in the present invention is preferably 0.005–10 moles, more preferably 0.01–5 moles, still more preferably 0.015–1.5 moles and most preferably 0.05–1.0 mole relative to 100 g of the above-mentioned resin and/or precursor thereof. The content of the salt of the metal other than aluminum in the present invention is preferably 0.005–10 moles, more preferably 0.01–5 moles, still most preferably 0.015–1.5 moles and most preferably 0.05–1.0 mole relative to 100 g of the above-mentioned resin and/or precursor thereof. The content of the total of the aluminum salt and the salt of the metal other than aluminum in the present invention is preferably 0.005–10 moles, more preferably 0.01–5 moles, still most preferably 0.015–1.5 moles and most preferably 0.05–1.0 mole relative to 100 g of the above-mentioned resin and/or precursor thereof.

The combination of the aluminum salt and the salt of the metal other than aluminum is most preferably that of aluminum dihydrogenphosphate and manganese phosphate.

The inorganic oxide particle in the present invention is, for example, a particle of an oxide of Si, Fe, Ge, Ti, Zr, Mg, Sn, Sb and Al. Examples thereof include colloidal silica; $SiO_2$ powder; colloid, sol and powder of $SnO_2$, $Fe_2O_3$, $Fe_3O_4$, MgO, $Al_2O_3$ and $ZrO_2$, from which one or more can be used. Of these, the use of $SiO_2$ is most preferable. These are effective for improvement in corrosion resistance and adhesion to a paint, as well as resistance to scratch and the like.

The aluminum-containing inorganic oxide particle in the present invention is free of particular limitation as long as it contains aluminum, oxygen and at least one element other than these two, as a part of the constituent components of the inorganic oxides constituting the inorganic oxide particle.

The element other than aluminum and oxygen is preferably Si, Fe, Ge, Ti, Zr, Mg, Sn and Sb. Of these, at least one member from colloid, sol and powder of $SiO_2$, $Fe_2O_3$, $Fe_3O_4$, MgO, $ZrO_2$, $SnO_2$ and $Sb_2O_5$ is preferably contained as a major constituent component of the inorganic oxide. Of these, $SiO_2$ is preferably one of the constituent components.

The above-mentioned aluminum-containing inorganic oxide particle is preferably an inoranic oxide particle surface-treated with an aluminum compound. Specifically, it is preferably colloidal silica surface-treated with an aluminum compound (hereinafter to be abbreviated as Al surface-treated colloidal silica).

The Al surface-treated colloidal silica is produced by, for example, treating the colloidal silica prepared by the sol—gel method with aluminate ion $(Al(OH)^{4-})$, which is disclosed in U.S. Pat. No. 2892797.

The above-mentioned aluminum-containing inorganic oxide particle can be used alone or in combination. The above-mentioned inorganic oxide particle of Al-free colloid, sol and the like of $SiO_2$, $Fe_2O_3$, $Fe_3O_4$, MgO, $ZrO_2$, $SnO_2$ and $Sb_2O_5$ may be used concurrently. In addition, the above-mentioned aluminum salt may be concurrently used.

The above-mentioned inorganic oxide particle and the above-mentioned aluminum-containing inorganic oxide particle preferably respectively have a particle size of 1–20 nm, and most preferably 4–6 nm.

The content of the above-mentioned inorganic oxide particle and the above-mentioned aluminum-containing inorganic oxide particle is respectively preferably 2–80 parts by weight, more preferably 2–70 parts by weight, still more preferably 10–70 parts by weight, and most preferably 20–60 parts by weight relative to 100 g of the above-mentioned resin and/or precursor thereof. When the above-mentioned inorganic oxide particle and the above-mentioned aluminum-containing inorganic oxide particle are concurrently used, the total content thereof is preferably 2–80 parts by weight, more preferably 2–70 parts by weight, still more preferably 10–70 parts by weight, and most preferably 20–60 parts by weight relative to 100 g of the above-mentioned resin and/or precursor thereof.

The agent for treating metallic surface of the present invention contains a phosphorus compound besides the above-mentioned constituent components. Examples of the phosphorus compound include phosphoric acids and derivatives thereof. The phosphoric acids dissolve the surface of a metal material and deteriorate the surface, so that they can improve adhesion between the metal material and the surface treatment layer. Examples of the usable phosphoric acids include phosphoric acid, polyphosphoric acid, hypophosphorous acid, tripolyphosphoric acid, hexametaphosphoric acid, polymetaphosphoric acid and salts thereof, and derivatives thereof (e.g., alkyl phosphate, phenyl phosphate and the like). Alternatively, the above-mentioned aluminum salt and the salt of the metal other than aluminum can also act as the phosphorus compound (e.g., the aluminum salt and the salt of the metal other than aluminum are salts of phosphoric acids).

When an aluminum salt and an inorganic oxide particle are contained in the agent for treating metallic surface of the present invention, it is required that the equivalent ratio of the elements of phosphorus/aluminum be not less than 0.1, preferably not less than 0.5, and more preferably not less than 1.0. When the equivalent ratio is less than 0.1, the phosphorus compound has less action on the surface of the metal material, which in turn results in weaker adhesion between the surface treatment layer and the metal material, and less anticorrosion effect by the surface treatment layer. While the upper limit is not particularly limited, it is preferably nor more than 1000.

The agent for treating metallic surface of the present invention is prepared by dissolution and/or dispersion of each constituent component in a solvent. The solvent usable in the present invention includes organic solvents and aqueous solvents, with preference given to aqueous solvents. Examples of the aqueous solvent include water and a mixture of water and a solvent compatible with water. The solvent compatible with water is exemplified by tetrahydrofuran, methyl ethyl ketone, isopropanol, methanol, ethanol, propanol, acetone, dimethylformamide, dimethylacetamide, dimethyl sulfoxide, dioxane and the like.

The inventive agent for treating metallic surface can further improve corrosion resistance by containing various oxidizing agents. The use of the oxidizing agent such as $N_2O_4$, $N_2O_3$, $N_2O$, $Cu(NO_3)_2$, $AgNO_3$, $NH_4NO_3$, $BaO_2$, $FeCl_2$, $CuSO_4$, $Cu(CH_3COO)_2$, $Hg(CH_3COO)_2$, $Bi(CH_3COO)_3$, $Ag_2O$, CuO, $Bi_2O_3$, $HMnO_4$ and $MnO_2$ is preferable. One or more of these can be used. The effect of the oxidizing agent is considered to immobilize the surface of the metal material.

The agent for treating metallic surface of the present invention preferably has a pH of 1.5–3.5, more preferably 2.0–3.0. By setting the pH to this range, a slight amount of metal is eluted out from the surface of the metal material, by which the metal element in the agent for treating metallic surface and the metal eluted out again precipitate on the surface of the metal material, thereby forming a complex metal film on the surface of the metal material. At the same time, the resin is pseudo-crosslinked by Al and other metal and the like, and these integrally form a strong surface treatment layer.

The above-mentioned action is frequently prominent when various metal materials, particularly steel materials such as cold draw steel plate, black steel plate, acid washed heat drawn steel plate, thick plate, shape steel, pipe, wire material and the like, a material made from a metal susceptible to immobilization such as copper, copper alloy, titanium, titanium alloy, nickel, nickel alloy, aluminum, aluminum alloy, magnesium, magnesium alloy, stainless and the like, or a material having a plating layer containing an element susceptible to immobilization such as Fe, Ni, Cr, Cu, Al, Mg, Ti and the like, are treated with the inventive agent for treating metallic surface.

While the reason therefor is not entirely clear at the moment, when the agent for treating metallic surface is applied to various metal materials, the metal element in the surface of the metal material partly elutes out as ion into the surface treatment layer, wherein excess elution of the ion leads to adsorption or binding therof to any of the constituent component of the surface treatment layer and degraded function of the constituent component, which in turn frequently degrades the function of the entire surface treatment layer. When the agent for treating metallic surface containing an oxidizing agent is applied to the surface of the metal material and the surface is immobilized, excess elution of the ion to the surface treatment layer can be greatly suppressed, thereby inhibiting the adverse consequence of the ion elution. As a result, superior film property is secured stably.

In the present invention, the agent for treating metallic surface is applied so that the solid content can be not less than 0.2 $g/m^2$, thereby to achieve superior adhesion to the metal material, adhesion to a paint, naked corrosion resistance of the processed part and resistance to flaw of the processed part. While the upper limit is not particularly limited, it is preferably 20 $g/m^2$ is preferable, more preferably 10 $g/m^2$, and still more preferably 5 $g/m^2$, from the economical aspect. In consideration of the welding of the surface-treated metal material, the thickness of the surface treatment layer is preferably not more than 5 $\mu$m, more preferably not more than 3 $\mu$m and most preferably not more than 2 $\mu$m.

When the surface treating agent of the present invention is sprayed on various metal plates, roll coating, spray coating, brush coating, immersion coating, curtain flow and any other method can be used.

In the present invention, the metal material is exemplified by a plated steel plate obtained by plating a steel plate with one kind of metal made from, for example, Zn, Ni, Cu, Fe, Al, Co, Cr, Ti, Mg, Mn, Sn, Pb and the like; an alloy-plated steel plate obtained by plating a steel plate with two or more of these metals; a plated steel plate obtained by dispersing a third metal and/or an inorganic compound such as silica, alumina, zirconia, titania and the like in the above-mentioned plated layer; an alloy plate made from two more of the above-mentioned metals, such as zinc or zinc alloy plate, copper or copper alloy plate, aluminum or aluminum alloy plate, magnesium or magnesium alloy plate, titanium or titanium alloy plate, nickel or nickel alloy plate, silicon steel plate, stainless and the like, and steel materials inclusive of cold draw steel plate, heat drawn black steel plate, acid washed heat drawn steel plate, thick plate, shape steel, pipe, wire materisl and the like. These are free of particular limitation and any metal material can be used as long as it is easily corroded. The agent for treating metallic surface of the present invention is applied to these metal materials, dried and cured as necessary to give a metal material having a chromium free surface treatment layer, which shows superior adhesion to the metal material and extremely excellent corrosion resistance and adhesion to a paint.

The coated metal material of the present invention is explained in the following. The coated metal material of the present invention comprises at least a metal material, a chromium-free surface treatment layer having a thickness of not more than 5 $\mu$m and a resin coating layer successively laminated, wherein, when the surface of the resin coating layer of the coated metal material is cut to mark an X shape (crosscut) with a knife that reaches the metal material and the coated metal material is subjected to the salt water spray treatment defined in JIS Z 2371, the maximum swelling width of the resin coating layer after 360 hours of the treatment is not more than 5 mm.

When the thickness of the surface treatment layer exceeds 5 $\mu$m, welding before forming a resin coating layer results in carbonization of the surface treatment layer by the heat and inferior welding property, and uniform electrodeposition of the resin coating layer by electrodeposition coating method cannot be achieved. The thickness of the surface treatment layer is preferably not more than 3 $\mu$m, more preferably not more than 2 $\mu$m and most preferably not more than 1.5 $\mu$m.

In a coated metal material having a resin coating layer that shows maximum swelling width exceeding 5 mm, pinholes occur on the resin coating layer surface or the surface is flawed and rust spreds rapidly from the damaged region. As a result, the resin coating layer peels off and the coated metal material no longer stands practical use. The maximum swelling width of the resin coating layer is preferably not more than 3 mm, more preferably not more than 2 mm.

The coated metal material of the present invention can be applied to various uses such as home appliances, body of an automobile and the like. Therefore, it is preferable that a cold draw steel plate be metal-plated and used as a metal material. Examples of preferable metal-plating include electrolytic plating and hot dip plating of Zn or Zn alloy (particularly zinc-nickel plating is preferable).

When such plated metal material is used, the crosscutting with a knife should be stopped at the plating layer for accurate evaluation of rustproof property.

To set the maximum swelling width of the resin coating layer in the present invention to not more than 5 mm, a chromium-free agent for treating metallic surface should be selected. Examples of the agent for treating metallic surface include a chromium-free agent for treating metallic surface comprising a mixture of an aluminum salt and an inorganic oxide particle, and/or an aluminum-containing inorganic oxide particle; a salt of a metal other than aluminum, a phosphorus compound; and a resin and/or a precursor thereof as constituent components.

The resin to be used for the resin coating layer may be a known one such as alkyd resin, polyester resin, polyurethane resin, epoxy resin, acrylic resin, modified resins thereof and the like. The resin may contain varioius pigments, ultraviolet absorbents and stabilizers. In addition, the resin may be crosslinked with various curing agents such as isocyanate compound, alkyl-etherized formaldehyde compound, epoxy compound, radical polymerizable compound and the like. The resin coating layer can be formed by applying an organic or aqueous painting, adhering a powder paint by heat, electrodeposition and the like.

The coated metal material of the present invention may be a postcoat product obtained by molding a surface-treated metal material and then forming a resin coating layer. It is preferably a precoat metal obtained by forming a surface treatment layer and a resin coating layer on a metal material in a roll before cutting and molding.

The surface-treated metal material of the present invention is explained in the following. The surface-treated metal material of the present invention comprises a metal material and a chromium-free surface treatment layer having a thickness of not more than 5 µm formed on the metal material, wherein, when the surface-treated metal material is subjected to a salt water spray treatment defined in JIS Z 2371, the surface treatment layer has a residual Si percentage as represented by the following formula after 360 hours of the treatment of not less than 0.5 and/or a residual P percentage as represented by the following formula after 360 hours of the treatment of not less than 0.5:

Residual Si percentage of the surface treatment layer=Si content of the surface treatment layer after 360 hours of the treatment/Si content of the surface treatment layer before the treatment Residual P percentage of the surface treatment layer=P content of the surface treatment layer after 360 hours of the treatment/P content of the surface treatment layer before the treatment The residual Si percentage is preferably not less than 0.6, more preferably not less than 0.7 and most preferably not less than 0.8, and the residual P percentage is preferably not less than 0.6, more preferably not less than 0.7 and most preferably not less than 0.8.

In a surface-treated metal material having residual Si and P percentages of less than 0.5, the adhesion between the surface treatment layer and the metal material decreases and the void in the surface treatment layer becomes greater. Consequently, oxygen, water and the like easily contact the surface of the metal material to easily produce rust. In addition, the interaction with the resin decreases and the surface treatment layer radically falls off.

When the surface treatment layer has a thickness greater than 5 µm, welding results in carbonization of the surface treatment layer by the heat and inferior welding property, and uniform electrodeposition of the resin coating layer by ectrodeposition coating method cannot be achieved. The thickness of the surface treatment layer is preferably not more than 3 µm, more preferably not more than 2 µm and most preferably not more than 1.5 µm.

A surface-treated metal material having a residual Si percentage of not less than 0.5 and/or a residual P percentage of not less than 0.5 can be obtained by the use of a chromium-free agent for treating metallic surface comprising a mixture of an aluminum salt acid and an inorganic oxide particle, and/or an aluminum-containing inorganic oxide particle; a salt of a metal other than aluminum; a phosphorus compound; and a resin and/or a precursor thereof as constituent components and other method.

The surface-treated metal material of the present invention comprises a metal material and a chromium-free surface treatment layer having a thickness of not more than 5 µm formed on the metal material, wherein, when the surface-treated metal material is subjected to the salt water spray treatment defined in JIS Z 2371, the surface treatment layer has a residual Al percentage as represented by the following formula after 360 hours of the treatment of not less than 0.5:

Residual Al percentage of the surface treatment layer=Al content of the surface treatment layer after 360 hours of the treatment/Al content of the surface treatment layer before the treatment.

The residual Al percentage is preferably not less than 0.6, more preferably not less than 0.7 and most preferably not less than 0.8.

In a surface-treated metal material having a residual Al percentage of less than 0.5, the adhesion between the surface treatment layer and the metal material decreases and the void in the surface treatment layer becomes greater. Consequently, oxygen, water and the like easily contact the surface of the metal material to easily produce rust. In addition, the interaction with the resin decreases and the surface treatment layer radically falls off.

When the surface treatment layer has a thickness greater than 5 µm, welding results in carbonization of the surface treatment layer by the heat and inferior welding property, and uniform electrodeposition of the resin coating layer by electrodeposition coating method cannot be achieved. The thickness of the surface treatment layer is preferably not more than 3 µm, more preferably not more than 2 µm and most preferably not more than 1.5 µm.

A surface-treated metal material having a residual Al percentage of not less than 0.5 can be obtained by the use of a chromium-free agent for treating metallic surface comprising a mixture of an aluminum salt and an inorganic oxide particle, and/or an aluminum-containing inorganic oxide particle; a salt of a metal other than aluminum; a phosphorus compound; and a resin and/or a precursor thereof as constituent components, and by other method.

The coated metal material and the surface-treated metal material of the present invention can be applied to home appliances and deskwork tools such as electric washing machine, TV, personal computer, word processor and the like; building materials such as roof, wall material, guard rail, various iron columns and the like; automobile parts such as body and gasoline tank; and the like. In addition, they can be applied to ship building parts; bridge steel made from thick plate and shape steel; wire ropes made from wire materials; various transport ducts made from pipe; steel furniture and efficiency furniture made from cold draw steel plate; containers made from heat drawn black steel plate and acid washed heat drawn steel plate, such as drum; box and compartment parts such as container; and the like.

Inasmuch as the agent for treating metallic surface of the present invention is chromium free and causes no pollution, it can be used for a wide range of applications, such as containers (e.g., food can and various cans), toys and the like. The surface treatment layer thus formed shows superior insulating property. Therefore, the agent of the present invention can be used for coating of an electromagnetic steel plate (silicon steel plate), particularly, a non-oriented electromagnetic steel plate.

(Action)

An Al compound in the agent for surface-treating steel plate has been disclosed. However, a resin and aluminum, as well as other elements have been left unsaid. Therefore, the present inventors have first elucidated that a combination of the following achieves high corrosion resistance.

(i) at least one of a mixture of an aluminum salt and an inorganic oxide particle, and an aluminum-containing inorganic oxide particle comprising aluminum, oxygen and at least one element other than these two (ii) a salt of a metal other than aluminum (iii) a phosphorus compound (iv) a resin and/or a precursor thereof When the residual percentage of aluminum is determined after various corrosion resistance tests, the inventive agent for treating metallic surface showed high residual percentage of aluminum and other metal elements other than aluminum, and other elements in the additives (e.g., Si, P and the like) in the surface treatment layer. In the agent for treating metallic surface of the present invention, it is postulated that each component interacts with each other to suppress falling out of each component from the surface of the metal material even under severe test conditions, but the mechanism is unknown. The present invention is not limited by the mechanism of corrosion resistance achieved by the present invention.

The present invention is explained by referring to the examples in the following. In the examples, "part" means "parts by weight" and "%" means "wt %" unless otherwise specified. Each determination item was in accordance with the following methods.

(1) Weight average molecular weight

A resin (0.005 g) was dissolved in tetrahydrofuran (10 cc) and the molecular weight was measured by GPC-LALLS apparatus, low angle light scattering photometer LS-8000 (manufactured by Toso, tetrahydrofuran solvent, reference: polystyrene).

(2) Aqueous dispersion particle size

An aqueous dispersion was adjusted to solid concentration (0.1 wt %) with ion exchange water and the particle size was measured by laser light scattering particle distributor, Coulter model N4 (manufactured by Coulter) at 20° C.

(3) Naked corrosion resistance

Using a salt water spray apparatus (salt water concentration 5%, tank inside temperature 35° C., spray pressure 200 PSI) according to JIS Z-2371 standard, the test was performed with regard to the surface-treated metal material obtained in Example or Comparative Example. After running the test for each period, occurrence of white rust was evaluated. As the naked corrosion resistance of the processed part, the surface-treated metal material was extruded by 6 mm Erichsen. By the same test as above, occurrence of white rust in the Erichsen part was observed.

◉: white rust occurrence area 0%, ◯: white rust occurrence area within 5%, Δ: white rust occurrence area within 10%, X: white rust occurrence area within 50%, XX: white rust occurrence area 50% or more (4) Adhesion to metal material The surface-treated metal material obtained in Example or Comparative Example was immersed in boiling water for 30 minutes, and the surface treatment layer was cut into 2 mm lattice pattern. The peel off area of the surface treatment layer was evaluated by peeling off with a tape.

◉: peel off area 0%, ◯: peel off area within 5%, Δ: peel off area within 10%, X: peel off area within 50%, XX: peel off area 50% or more (5) Adhesion to paint after treatment with boiling water A melamine low temperature baking paint (manufactured by KANSAI PAINT CO., LTD., AMILAC™ 1000) was applied to the surface treatment layer of the surface-treated metal material obtained in Example or Comparative Example, so that the paint would have a thickness after baking of 30 μm, and baked at 135° C. for 30 minutes. The dried steel plate was immersed in boiling water for 1 hour for treatment. The resin coating layer was cut into 2 mm lattice pattern. The peel off area of the resin coating layer was evaluated by peeling off with a tape.

◉: peel off area 0%, ◯: peel off area within 5%, Δ: peel off area within 10%, X: peel off area within 50%, XX: peel off area 50% or more (6) Residual percentage of element of the surface treatment layer Using a salt water spray apparatus (salt water concentration 5%, tank inside temperature 35° C., spray pressure 200 PSI) according to JIS Z-2371 standard, the test was performed with regard to the surface-treated metal material obtained in Example or Comparative Example for 360 hours. The surface-treated steel plate before and after test were cut into 3.3 cm×3.3 cm pieces and subjected to determination with fluorescent X ray determination appratus 3270 (manufactured by RIGAKU CO., LTD.), whereby peak intensity corresponding to each element was determined. The residual percentage of element of the surface treatment layer was calculated by the following formula:

Residual percentage of element of the surface treatment layer=(peak intensity of sample after the test)/(peak intensity of sample before the test)

(7) Crosscut test

An agent for treating metallic surface was applied to a zinc electroplated steel plate (70 mm×150 mm, adhered zinc 30 g/m$^2$) to the total solid content of 1.0 g/m$^2$ (thickness 1.0 μm) and dried at 200° C. for 30 seconds. A melamine low temperature baking paint (manufactured by by KANSAI PAINT CO., LTD., AMILAC™ 1000) was applied to the surface treatment layer of the surface-treated metal material obtained in Example or Comparative Example, so that the paint would have a thickness after baking of 30 μm, and baked at 135° C. for 30 minutes. The obtained resin coating layer was cut in an X-shape (crosscut) to reach the plating layer with a cutter knife manufactured by Olfa, wherein two about 10 cm long cuts cross at the central part of each coating, forming an angle of about 45 degrees. Using a salt water spray apparatus (salt water concentration 5%, tank inside temperature 35° C., spray pressure 200 PSI) according to JIS Z-2371 standard, the test was performed for 360 hours. After the test, the maximum swelling width of the resin coating layer from the crosscut part was measured. The maximum swelling width was measured with a verneir calipers and when the width was not clear, the swolen coated layer was peeled off with a needle and the like and the swollen width was measured.

PRODUCTION EXAMPLE OF RESIN (A-1)

Into a reaction vessel equipped with a stirrer, a thermometer and a refluxing apparatus were charged water (360 parts), sodium styrenesulfonate (1.5 parts), potassium persulfate (2 parts) and the mixture was heated to 70° C. Then, styrene (16 parts), methyl methacrylate (36 parts), glycerine monomethacrylate (20 parts) and methacrylic acid (16 parts) were added over 3 hours while keeping the temperature at 70° C. The reaction was carried out at 70° C. for 3 hours and the reaction mixture was cooled to room temperature to give an aqueous dispersion of acrylic resin (A-1) having a solid concentration of 20%. The obtained aqueous dispersion had an average particle size of 200 nm.

PRODUCTION EXAMPLE OF RESIN (A-2)

Into a stainless steel autoclave equipped with a stirrer, a thermometer and a partial reflux condenser were charged dimethyl terephthalate (262 parts), dimethyl isophthalate (262 parts), sodium 5-sulfonatoisophthalic acid dimethyl ester (89 parts), ethylene gylcol (279 parts), ethylene oxide adduct of bisphenol A (manufactured by SANYO CHEMICAL INDUSTRIES, LTD., BPE20F, 672 parts) and tetra-n-butyl titanate (0.52 part), and ester exchange reaction was conducted from 160° C. to 220° C. over 4 hours. Then, the reaction mixture was heated to 255° C. and the reaction system was gradually depressurized and reacted under reduced pressure of 0.2 mmHg for 1.5 hours to give a polyester. The obtained polyester was pale-yellow transparent and had a weight average molecular weight of 11000.

Into a reaction vessel equipped with a stirrer, a thermometer and a refluxing apparatus were charged the obtained polyester (80 parts), methyl ethyl ketone (40 parts) and tetrahydrofuran (40 parts) and the mixture was dissolved under refluxing. When the resin was dissolved, water (200 parts) was added and the mixture was stirred for 10 minutes. The solvent remaining in the medium was evaporated by heating to give a final aqueous dispersion of polyester resin (A-2). The obtained aqueous dispersion was milky white and had an average particle size of 150 nm.

PRODUCTION EXAMPLE OF RESIN (A-3)

Into a stainless steel autoclave equipped with a stirrer, a thermometer and a partial reflux condenser were charged dimethyl terephthalate (456 parts), dimethyl isophthalate (456 parts), sodium 5-sulfonatoisophthalic acid dimethyl ester (59 parts), ethylene gylcol (233 parts), 3-methyl-1,5-pentanediol (443 parts), ethylene oxide adduct of bisphenol A (manufactured by SANYO CHEMICAL INDUSTRIES, LTD., BPE20F, 1120 parts) and tetra-n-butyl titanate (0.52 part), and ester exchange reaction was conducted from 160° C. to 220° C. over 4 hours. Then, fumaric acid (11.6 parts) was added and esterification was conducted by elevating the temperature from 200° C. to 220° C. over 1 hour. Then, the reaction mixture was heated to 255° C. and the reaction system was gradually depressurized and reacted under reduced pressure of 0.2 mmHg for 1.5 hours to give a polyester. The obtained polyester was pale-yellow transparent and had a weight average molecular weight of 18000 and unsaturated bond content of 51 mol/$10^6$ g. Into a reaction vessel equipped with a stirrer, a thermometer and a refluxing apparatus were charged the obtained polyester (66 parts), methyl methacrylate (18 parts), glycerine monomethacrylate (10 parts), methacrylic acid (8 parts), isopropyl alcohol (16 parts) and hydroquinone (0.01 part), and the mixture was heated to 90° C. for dissolution. When the resin was dissolved, styrene (8 parts) was added and water (180 parts) was added while maintaining the mixture at 70° C., which was followed by stirring for 10 minutes. Then, an aqueous solution of sodium styrenesulfonate (0.6 part) dissolved in water (40 parts) was added, and then potassium persulfate (0.9 part) and water (10 parts) were added to initiate polymerization. The reaction was continued at 70° C. for 4 hours and the reaction mixture was cooled to room temperature to give a final aqueous dispersion of acryl-modified polyester resin (A-3) having a solid concentration of 30%. The obtained aqueous dispersion had an average particle size of 150 nm.

PRODUCTION EXAMPLE OF RESIN (A-4)

Into a reaction vessel equipped with a stirrer, a thermometer, a refluxing apparatus and dripping apparatus were charged bisphenol A type epoxy resin (manufactured by TOHTO KASEI CO., LTD., YD-017, 60 parts) and methyl ethyl ketone (100 parts) and the mixture was heated, stirred and refluxed to dissolve the resin. When the resin was dissolved completely, maleic anhydride (2 parts) was added and after confirmation of dissolution, pyridine (0.01 part) was added and the mixture was reacted under refluxing for 2 hours. A mixture of styrene (10 parts), 2-hydroxyethyl acrylate (6 parts), methacrylic acid (8 parts), acrylamidomethylpropanesulfonic acid (2 parts), dibutyl fumarate (4 parts), azobisisobutyronitrile (2 parts), α-methylstyrene dimer (2 parts), methyl ethyl ketone (60 parts) and water (3 parts) was dropwise added over 1.5 hours into the reaction vessel, which was followed by reaction for 2.5 hours to allow polymerization of the unsaturated monomer mixture. Thereto was added triethylamine (20 parts) for neutralization and isopropyl alcohol (60 parts) and ion exchange water (200 parts) were added and the mixture was stirred for 30 minutes. The solvent remaining in the medium was evaporated by heating to give a final aqueous dispersion of acryl-epoxy resin (A-4). The obtained aqueous dispersion was milky white and had an average particle size of 50 nm and B type viscosity at 25° C. of 50 cps. The polymer of the unsaturated monomer mixture had a weight average molecular weight upon polystyrene conversion of 8000, and the amount of hydroxyl group was 0.17 equivalent/100 g, carboxyl group content was 0.31 equivalent/100 g, and the amount of sulfonic acid group was 0.03 equivalent/100 g.

EXAMPLE 1

To a Zn electroplated steel plate (weight of plating: 30 g/m$^2$) was applied an aqueous solution containing acrylic resin (A-1) (70 g/l), aluminum acetate (3 g/l), manganese(II) phosphate (10 g/l) and colloidal silica (manufactured by Nissan Chemical Industries, Ltd., Snow tex™ ST-O-S, particle size 8–11 nm, 10 g/l) with a roll. The coating was dried at 200° C. to give a film having a total coating weight of 1.00 g/m$^2$ (film thickness 1.0 µm).

EXAMPLE 2

To a Zn electroplated steel plate (weight of plating: 30 g/m$^2$) was applied an aqueous solution containing acrylic resin (A-1) (70 g/l), aluminum dihydrogenphosphate (4 g/l), iron(III) phosphate (12 g/l) and colloidal silica (manufactured by Nissan Chemical Industries, Ltd., Snow tex™ ST-O-XS, particle size 4–6 nm, 10 g/l) with a roll. The coating was dried at 200° C. to give a film having a total coating weight of 1.00 g/m$^2$ (film thickness 1.0 µm).

EXAMPLE 3

To a Zn electroplated steel plate (weight of plating: 30 g/m$^2$) was applied an aqueous solution containing acrylic resin (A-1) (70 g/l), aluminum nitrate (15 g/l), copper phosphate (10 g/l), phosphoric acid (10 g/l) and colloidal silica (manufactured by Nissan Chemical Industries, Ltd., Snow tex™ ST-O-XS, particle size 4–6 nm, 15 g/l) with a roll. The coating was dried at 150° C. to give a film having a total coating weight of 1.00 g/m$^2$ (film thickness 1.0 µm).

EXAMPLE 4

To a Zn electroplated steel plate (weight of plating: 30 g/m$^2$) was applied an aqueous solution containing acrylic resin (A-1) (70 g/l), aluminum sulfate (10 g/l), magnesium monohydrogenphosphate (12 g/l), phosphoric acid (12 g/l) and colloidal silica (manufactured by Nissan Chemical Industries, Ltd., Snow tex™ ST-O-XS, particle size 4–6 nm, 10 g/l) with a roll. The coating was dried at 150° C. to give a film having a total coating weight of 1.00 g/m$^2$ (film thickness 1.0 µm).

EXAMPLE 5

To a Zn electroplated steel plate (weight of plating: 30 g/m$^2$) was applied an aqueous solution containing acrylic resin (A-1) (60 g/l), aluminum chloride (2 g/l), calcium dihydrogenphosphate (4 g/l), manganese(II) phosphate (4 g/l), phosphoric acid (12 g/l) and colloidal silica (manufactured by Nissan Chemical Industries, Ltd., Snow tex™ ST-O-XS, particle size 4–6 nm, 10 g/l) with a roll. The coating was dried at 200° C. to give a film having a total coating weight of 1.00 g/m$^2$ (film thickness 1.0 µm).

EXAMPLE 6

Performed in the same manner as in Example 1 except the resin was changed to polyester resin (A-2).

EXAMPLE 7

Performed in the same manner as in Example 2 except the resin was changed to polyester resin (A-2).

EXAMPLE 8

Performed in the same manner as in Example 3 except the resin was changed to polyester resin (A-2).

EXAMPLE 9

Performed in the same manner as in Example 4 except the resin was changed to polyester resin (A-2).

EXAMPLE 10

Performed in the same manner as in Example 5 except the resin was changed to polyester resin (A-2).

EXAMPLE 11

Performed in the same manner as in Example 1 except the resin was changed to acryl-modified polyester resin (A-3).

EXAMPLE 12

Performed in the same manner as in Example 2 except the resin was changed to acryl-modified polyester resin (A-3).

EXAMPLE 13

Performed in the same manner as in Example 3 except the resin was changed to acryl-modified polyester resin (A-3).

EXAMPLE 14

Performed in the same manner as in Example 4 except the resin was changed to acryl-modified polyester resin (A-3).

EXAMPLE 15

Performed in the same manner as in Example 5 except the resin was changed to acryl-modified polyester resin (A-3).

COMPARATIVE EXAMPLE 1

To a Zn electroplated steel plate (weight of plating: 30 g/m$^2$) was applied an aqueous solution containing acrylic resin (A-1) (70 g/l), aluminum nitrate (8 g/l) and colloidal silica (manufactured by Nissan Chemical Industries, Ltd., Snow tex™ ST-O-S, particle size 8–11 nm, 10 g/l) with a roll. The coating was dried at 200° C. to give a film having a total coating weight of 1.00 g/m$^2$ (film thickness 1.0 µm).

COMPARATIVE EXAMPLE 2

To a Zn electroplated steel plate (weight of plating: 30 g/m$^2$) was applied an aqueous solution containing polyester resin (A-2) (70 g/l), manganese(II) phosphate (5 g/l), calcium dihydrogenphosphate (4 g/l), phosphoric acid (5 g/l) and colloidal silica (manufactured by Nissan Chemical Industries, Ltd., Snow tex™ ST-O-XS, particle size 4–6 nm, 15 g/l) with a roll. The coating was dried at 200° C. to give a film having a total coating weight of 1.00 g/m$^2$ (film thickness 1.0 µm).

COMPARATIVE EXAMPLE 3

To a Zn electroplated steel plate (weight of plating: 30 g/m$^2$) was applied an aqueous solution containing acryl-modified polyester resin (A-3) (70 g/l), calcium dihydrogenphosphate (10 g/l) and phosphoric acid (10 g/l) with a roll. The coating was dried at 200° C. to give a film having a total coating weight of 1.00 g/m$^2$ (film thickness 1.0 µm).

COMPARATIVE EXAMPLE 4

To a Zn electroplated steel plate (weight of plating: 30 g/m$^2$) was applied an aqueous solution containing acryl-modified polyester resin (A-3) (70 g/l), aluminum sulfate (20 g/l) and phosphoric acid (0.1 g/l) with a roll. The coating was dried at 200° C. to give a film having a total coating weight of 1.00 g/m$^2$ (film thickness 1.0 µm).

EXAMPLE 16

To a Zn electroplated steel plate (weight of plating: 30 g/m$^2$) was applied an aqueous solution containing acrylic resin (A-1) (70 g/l), manganese(II) phosphate (10 g/l) and Al surface-treated colloidal silica (manufactured by Nissan Chemical Industries, Ltd., Snow tex™ ST-C, particle size 10–20 nm, 10 g/l) with a roll. The coating was dried at 200° C. to give a film having a total coating weight of 1.00 g/m$^2$ (film thickness 1.0 µm).

EXAMPLE 17

To a Zn electroplated steel plate (weight of plating: 30 g/m$^2$) was applied an aqueous solution containing acrylic resin (A-1) (70 g/l), iron(II) phosphate (12 g/l) and Al surface-treated colloidal silica (manufactured by Nissan Chemical Industries, Ltd., Snow tex™ ST-CXS-9, particle size 4–6 nm, 10 g/l) with a roll. The coating was dried at 200° C. to give a film having a total coating weight of 1.00 g/m$^2$ (film thickness 1.0 µm).

EXAMPLE 18

To a Zn electroplated steel plate (weight of plating: 30 g/m$^2$) was applied an aqueous solution containing acrylic resin (A-1) (70 g/l), copper phosphate (10 g/l), phosphoric acid (10 g/l) and Al surface-treated colloidal silica (manufactured by Nissan Chemical Industries, Ltd., Snow tex™ ST-C, particle size 10–20 NM, 15 g/l) with a roll. The coating was dried at 150° C. to give a film having a total coating weight of 1.00 g/m$^2$ (film thickness 1.0 µm).

EXAMPLE 19

To a Zn electroplated steel plate (weight of plating: 30 g/m$^2$) was applied an aqueous solution containing acrylic resin (A-1) (70 g/l), manganese(II) phosphate (12 g/l), calcium dihydrogenphosphate (10 g/l), phosphoric acid (12 g/l) and Al surface-treated colloidal silica (manufactured by Nissan Chemical Industries, Ltd., Snow tex™ ST-CXS-9, particle size 4–6 nm, 10 g/l) with a roll. The coating was dried at 150° C. to give a film having a total coating weight of 1.00 g/m$^2$ (film thickness 1.0 µm).

EXAMPLE 20

Performed in the same manner as in Example 16 except the resin was changed to polyester resin (A-2).

EXAMPLE 21

Performed in the same manner as in Example 17 except the resin was changed to polyester resin (A-2).

EXAMPLE 22

Performed in the same manner as in Example 18 except the resin was changed to polyester resin (A-2).

EXAMPLE 23

Performed in the same manner as in Example 19 except the resin was changed to polyester resin (A-2).

EXAMPLE 24

Performed in the same manner as in Example 16 except the resin was changed to acryl-modified polyester resin (A-3).

EXAMPLE 25

Performed in the same manner as in Example 17 except the resin was changed to acryl-modified polyester resin (A-3).

EXAMPLE 26

Performed in the same manner as in Example 18 except the resin was changed to acryl-modified polyester resin (A-3).

EXAMPLE 27

Performed in the same manner as in Example 19 except the resin was changed to acryl-modified polyester resin (A-3).

EXAMPLE 28

Performed in the same manner as in Example 16 except the resin was changed to acryl-epoxy resin (A-4).

EXAMPLE 29

Performed in the same manner as in Example 17 except the resin was changed to acryl-epoxy resin (A-4).

EXAMPLE 30

Performed in the same manner as in Example 18 except the resin was changed to acryl-epoxy resin (A-4).

EXAMPLE 31

Performed in the same manner as in Example 19 except the resin was changed to acryl-epoxy resin (A-4).

COMPARATIVE EXAMPLE 5

To a Zn electroplated steel plate (weight of plating: 30 g/m$^2$) was applied an aqueous solution containing acrylic resin (A-1) (70 g/l), copper phosphate (10 g/l) and colloidal silica (manufactured by Nissan Chemical Industries, Ltd., Snow tex™ ST-20, particle size 10–20 nm, 10 g/l) with a roll. The coating was dried at 200° C. to give a film having a total coating weight of 1.00 g/m$^2$ (film thickness 1.0 µm).

COMPARATIVE EXAMPLE 6

To a Zn electroplated steel plate (weight of plating: 30 g/m$^2$) was applied an aqueous solution containing polyester resin (A-2) (70 g/l), manganese(II) phosphate (5 g/l), phosphoric acid (5 g/l) and colloidal silica (manufactured by Nissan Chemical Industries, Ltd., Snow tex™ ST-O-XS, particle size 4–6 nm, 15 g/l) with a roll. The coating was dried at 200° C. to give a film having a total coating weight of 1.00 g/m$^2$ (film thickness 1.0 µm).

COMPARATIVE EXAMPLE 7

To a Zn electroplated steel plate (weight of plating: 30 g/m$^2$) was applied an aqueous solution containing acryl-modified polyester resin (A-3) (70 g/l), manganese(II) phosphate (10 g/l) and phosphoric acid (10 g/l) with a roll. The coating was dried at 200° C. to give a film having a total coating weight of 1.00 g/m$^2$ (film thickness 1.0 µm).

COMPARATIVE EXAMPLE 8

To a Zn electroplated steel plate (weight of plating: 30 g/m$^2$) was applied a chemical conversion treatment (zinc phosphate 2.00 g/m$^2$).

EXAMPLE 32

To a Zn plated steel plate (weight of plating: 30 g/m$^2$) was applied an aqueous solution containing acrylic resin (A-1) (70 g/l), manganese(II) phosphate (12 g/l), aluminum nitrate (5 g/l) and Al surface-treated colloidal silica (manufactured by Nissan Chemical Industries, Ltd., Snow tex™ ST-CXS-9, particle size 4–6 nm, 10 g/l) with a roll. The coating was dried at 200° C. to give a film having a total coating weight of 1.00 g/m$^2$.

EXAMPLE 33

To a Zn—Ni plated steel plate (weight of plating: 30 g/m$^2$) was applied an aqueous solution containing acrylic resin (A-1) (70 g/l), phosphoric acid (10 g/l), aluminum phosphate (4 g/l), calcium dihydrogenphosphate (8 g/l) and Al surface-treated colloidal silica (manufactured by Nissan Chemical Industries, Ltd., Snow tex™ ST-C, particle size 10–20 nm, 12 g/l) with a roll. The coating was dried at 200° C. to give a film having a total coating weight of 1.00 g/m$^2$.

EXAMPLE 34

To a Zn plated steel plate (weight of plating: 30 g/m$^2$) was applied an aqueous solution containing acrylic resin (A-1) (70 g/l), aluminum sulfate (6 g/l), iron(II) phosphate (12 g/l) and Al surface-treated colloidal silica (manufactured by Nissan Chemical Industries, Ltd., Snow tex™ ST-CXS-9, particle size 4–6 nm, 12 g/l) with a roll. The coating was dried at 200° C. to give a film having a total coating weight of 1.00 g/m$^2$ (film thickness 1.0 µm).

EXAMPLE 35

To a Zn plated steel plate (weight of plating: 30 g/m$^2$) was applied an aqueous solution containing acrylic resin (A-1) (70 g/l), manganese(II) phosphate (12 g/l), aluminum phosphate (6 g/l), phosphoric acid (12 g/l) and Al surface-treated colloidal silica (manufactured by Nissan Chemical Industries, Ltd., Snow tex™ ST-CXS-9, particle size 4–6 nm, 10 g/l) with a roll. The coating was dried at 150° C. to give a film having a total coating weight of 1.00 g/m$^2$.

EXAMPLE 36

Performed in the same manner as in Example 32 except the resin was changed to polyester resin (A-2).

EXAMPLE 37

Performed in the same manner as in Example 33 except the resin was changed to polyester resin (A-2).

EXAMPLE 38

Performed in the same manner as in Example 34 except the resin was changed to polyester resin (A-2).

EXAMPLE 39

Performed in the same manner as in Example 35 except the resin was changed to polyester resin (A-2).

EXAMPLE 40

Performed in the same manner as in Example 32 except the resin was changed to acryl-modified polyester resin (A-3).

EXAMPLE 41

Performed in the same manner as in Example 33 except the resin was changed to acryl-modified polyester resin (A-3).

EXAMPLE 42

Performed in the same manner as in Example 34 except the resin was changed to acryl-modified polyester resin (A-3).

EXAMPLE 43

Performed in the same manner as in Example 35 except the resin was changed to acryl-modified polyester resin (A-3).

EXAMPLE 44

Performed in the same manner as in Example 32 except the resin was changed to acryl-epoxy resin (A4).

EXAMPLE 45

Performed in the same manner as in Example 33 except the resin was changed to acryl-epoxy resin (A-4).

EXAMPLE 46

Performed in the same manner as in Example 34 except the resin was changed to acryl-epoxy resin (A-4).

EXAMPLE 47

Performed in the same manner as in Example 35 except the resin was changed to acryl-epoxy resin (A-4).

EXAMPLE 48

To a Zn electroplated steel plate (weight of plating: 20 g/m$^2$) was applied a liquid obtained by admixing aluminum diydrogenphosphate (100 parts by weight), manganese(II) phosphate (60 parts by weight), 4–6 nm colloidal silica (70 parts by weight) and an aqueous organic resin emulsion (1200 parts by weight) of a 1-hydroxybutyl acrylate—methyl methacrylate—butyl acrylate—styrene—methacrylic acid copolymer, and adjusting to pH 2.5. The coating was dried at 120° C. to give a film having a weight after drying of 1.2 g/m$^2$.

EXAMPLE 49

To a Zn hot dip-plated steel plate (weight of plating: 90 g/m$^2$) was applied a liquid obtained by admixing aluminum dihydrogenphosphate (100 parts by weight), manganese(II) phosphate (80 parts by weight), 7–8 nm colloidal silica (50 parts by weight) and an aqueous organic resin emulsion (1000 parts by weight) of a 2-bis(hydroxymethyl)ethyl methacrylate—methyl methacrylate—butyl acrylate—glycidyl methacrylate—acrylic acid copolymer, and adjusting to pH 2.1. The coating was dried at 100° C. to give a film having a weight after drying of 0.9 g/m$^2$.

EXAMPLE 50

To a Zn—Ni alloy plated steel plate (weight of plating: 20 g/m$^2$, Ni=11.5%) was applied a liquid obtained by admixing aluminum dihydrogenphosphate (100 parts by weight), calcium phosphate (55 parts by weight), 15–20 nm colloidal silica (100 parts by weight) and an aqueous organic resin emulsion (1400 parts by weight) of a 2-bis(hydroxymethyl)ethyl methacrylate—methyl methacrylate—butyl acrylate—glycidyl methacrylate—acrylic acid copolymer, and adjusting to pH 3.0. The coating was dried at 150° C. to give a film having a weight after drying of 1.7 g/m$^2$.

EXAMPLE 51

To a Zn—Ni alloy plated steel plate (weight of plating: 20 g/m$^2$, Ni=12.3%) was applied a liquid obtained by admixing aluminum dihydrogenphosphate (100 parts by weight), magnesium phosphate (30 parts by weight), 10–12 nm colloidal silica (150 parts by weight) and an aqueous organic resin emulsion (900 parts by weight) of a 2,3-dihydroxypropyl methacrylate—methyl methacrylate—butyl acrylate—glycidyl methacrylate—methacrylic acid copolymer, and adjusting to pH 2.6. The coating was dried at 130° C. to give a film having a weight after drying of 1.2 g/m$^2$.

EXAMPLE 52

To a Zn—Fe alloy plated steel plate (weight of plating: 20 g/m$^2$, Fe=12.8%) was applied a liquid obtained by admixing aluminum phosphate (100 parts by weight), manganese(II) acetate (60 parts by weight), 4–6 nm colloidal silica (120 parts by weight) and an aqueous organic resin emulsion (1000 parts by weight) of a hydroxyethyl acrylate—methyl methacrylate—butyl acrylate—styrene—glycidyl methacrylate—methacrylic acid copolymer, and adjusting to pH 2.3. The coating was dried at 80° C. to give a film having a weight after drying of 0.8 g/m$^2$.

EXAMPLE 53

To a Zn—Mg alloy plated steel plate (weight of plating: 30 g/m$^2$, Mg=1.2%) was applied a liquid obtained by admixing aluminum dihydrogenphosphate (100 parts by weight), calcium acetate (70 parts by weight), 7–10 nm colloidal silica (160 parts by weight) and an aqueous organic resin emulsion (800 parts by weight) of an N-methylolacrylamide—methyl methacrylate—butyl acrylate—glycidyl methacrylate—methacrylic acid—acrylic acid copolymer, and adjusting to pH 1.7. The coating was dried at 180° C. to give a film having a weight after drying of 1.8 g/m$^2$.

EXAMPLE 54

To a Zn—Ni alloy plated steel plate (weight of plating: 20 g/m$^2$, Ni=12.4%) was applied a liquid obtained by admixing aluminum dihydrogenphosphate (100 parts by weight), manganese(II) formate (65 parts by weight), 1–4 nm colloidal silica (10 parts by weight) and an aqueous organic resin emulsion (1600 parts by weight) of an allyl glycidyl ether—methyl methacrylate—butyl acrylate—glycidyl methacrylate—acrylic acid—hydroxyethyl acrylate copolymer, and adjusting to pH 3.5. The coating was dried at 110° C. to give a film having a weight after drying of 1.3 g/m$^2$.

EXAMPLE 55

To a Zn—Mg alloy plated steel plate (weight of plating: 30 g/m$^2$, Mg=1.2%) was applied a liquid obtained by admixing aluminum phosphate (100 parts by weight), manganese(II) phosphate (65 parts by weight), 2–5 nm colloidal silica (120 parts by weight) and an aqueous organic resin emulsion (900 parts by weight) of a glycidyl methacrylate—ethyl methacrylate—butyl acrylate—methacrylic acid—hydroxyethyl acrylate copolymer, and adjusting to pH 2.5. The coating was dried at 100° C. to give a film having a weight after drying of 1.0 g/m$^2$.

EXAMPLE 56

To a Zn electroplated steel plate (weight of plating: 20 g/m$^2$) was applied a liquid obtained by admixing aluminum hydrogenphosphate (100 parts by weight), calcium dihydrogenphosphate (75 parts by weight), 10–15 nm colloidal silica (80 parts by weight) and an aqueous organic resin emulsion (1100 parts by weight) of a glycidyl methacrylate—ethyl methacrylate—butyl acrylate—methacrylic acid—acrylic acid copolymer, and adjusting to pH 1.7. The coating was dried at 130° C. to give a film having a weight after drying of 1.0 g/m$^2$.

EXAMPLE 57

To a Zn hot dip-plated steel plate (weight of plating: 120 g/m$^2$) was applied a liquid obtained by admixing aluminum dihydrogenphosphate (100 parts by weight), magnesium phosphate (35 parts by weight), 7–10 nm colloidal silica (100 parts by weight) and an aqueous organic resin emulsion (1000 parts by weight) of a 3-chloro-2-hydroxypropyl methacrylate—methyl methacrylate—butyl acrylate—glycidyl methacrylate—acrylic acid copolymer, and adjusting to pH 3.1. The coating was dried at 130° C. to give a film having a weight after drying of 1.5 g/m$^2$.

EXAMPLE 58

To a Zn electroplated steel plate (weight of plating: 20 g/m$^2$) was applied a liquid obtained by admixing aluminum phosphate (100 parts by weight), strontium phosphate (45 parts by weight), 4–6 nm colloidal silica (80 parts by weight) and an aqueous organic resin emulsion (1200 parts by weight) of an N-butoxymethylolmethacrylamide—methyl methacrylate—butyl acrylate—methacrylic acid—acrylic acid—hydroxyethyl acrylate copolymer, and adjusting to pH 2.7. The coating was dried at 120° C. to give a film having a weight after drying of 0.9 g/m$^2$.

EXAMPLE 59

To a cold draw steel plate was applied a liquid obtained by admixing aluminum dihydrogenphosphate (100 parts by weight), manganese(II) phosphate (65 parts by weight), 8–10 nm colloidal silica (80 parts by weight), an aqueous organic resin emulsion (80 parts by weight) of a 3-chloro-2-hydroxypropyl methacrylate—methyl methacrylate—butyl acrylate—glycidyl methacrylate—acrylic acid copolymer, and nitric acid (6 parts by weight), and adjusting to pH 2.5. The coating was dried at 100° C. to give a film having a weight after drying of 1.2 g/m$^2$.

EXAMPLE 60

To a thick plate for ship building from which black surface had been removed by shot blasting was applied a liquid obtained by admixing aluminum dihydrogenphosphate (100 parts by weight), manganese(II) phosphate (80 parts by weight), 8–10 nm colloidal silica (40 parts by weight) and an aqueous organic resin emulsion (80 parts by weight) of a glycidyl methacrylate—ethyl methacrylate—butyl acrylate—methacrylic acid—acrylic acid copolymer, and MnO$_2$ (10 parts by weight), and adjusting to pH 1.7. The coating was dried at 80° C. to give a film having a weight after drying of 4.0 g/m$^2$.

COMPARATIVE EXAMPLE 9

To a Zn electroplated steel plate was applied an aqueous solution containing chromic acid (hexavalent Cr 100% chromic acid, 100 parts by weight) and phosphoric acid (70 parts by weight) with a roll. The coating was dried at 160° C. to give a chromate film having a total coating weight upon conversion to Cr of 62 mg/m$^2$.

COMPARATIVE EXAMPLE 10

To a Zn hot dip-plated steel plate (weight of plating: 110 g/m$^2$) was applied an aqueous solution containing chromic acid (hexavalent Cr 100% chromic acid, 100 parts by weight), phosphoric acid (50 parts by weight) and 10–15 nm colloidal silica (60 parts by weight) with a roll. The coating was dried at 180° C. to give a chromate film having a total coating weight upon conversion to Cr of 48 mg/m$^2$.

COMPARATIVE EXAMPLE 11

To a Zn electroplated steel plate (weight of plating: 20 g/m$^2$) was applied an aqueous solution containing chromic acid (hexavalent Cr 100% chromic acid, 100 parts by weight), phosphoric acid (50 parts by weight) and olefin-acrylic acid copolymer resin emulsion (120 parts by weight) with a roll. The coating was dried at 120° C. to give a chromate film having a total coating weight upon conversion to Cr of 72 mg/m$^2$.

COMPARATIVE EXAMPLE 12

To a Zn—Ni alloy plated steel plate (weight of plating: 20 g/m$^2$, Ni=12.9) was applied an aqueous solution containing chromic acid (hexavalent Cr 100% chromic acid, 100 parts by weight), phosphoric acid (60 parts by weight) and olefin-acrylic acid copolymer resin emulsion (200 parts by weight) with a roll. The coating was dried at 160° C. to give a chromate film having a total coating weight upon conversion to Cr of 92 mg/m$^2$.

The results are shown in Table 1 to Table 7.

TABLE 1

| | Organic resin | Adhesion to metal material | Naked corrosion resistance (time) | | | | | | | | Adhesion to paint after boiling water resistance treatment | P/Al ratio (equivalent) |
|---|---|---|---|---|---|---|---|---|---|---|---|---|
| | | | 24 | 48 | 72 | 120 | 240 | 360 | 480 | 600 | | |
| Ex. 1 | A-1 | ⊚ | ⊚ | ⊚ | ⊚ | ⊚ | ⊚ | ○ | ○ | ○ | ⊚ | 2.7 |
| Ex. 2 | A-1 | ⊚ | ⊚ | ⊚ | ⊚ | ⊚ | ⊚ | ○ | ○ | ○ | ⊚ | 6.8 |
| Ex. 3 | A-1 | ⊚ | ⊚ | ⊚ | ⊚ | ⊚ | ⊚ | ⊚ | ⊚ | ⊚ | ⊚ | 1.5 |

TABLE 1-continued

| | Organic resin | Adhesion to metal material | Naked corrosion resistance (time) | | | | | | | | Adhesion to paint after boiling water resistance treatment | P/Al ratio (equivalent) |
|---|---|---|---|---|---|---|---|---|---|---|---|---|
| | | | 24 | 48 | 72 | 120 | 240 | 360 | 480 | 600 | | |
| Ex. 4 | A-1 | ◉ | ◉ | ◉ | ◉ | ◉ | ◉ | ◉ | ◉ | ◉ | ◉ | 3.8 |
| Ex. 5 | A-1 | ◉ | ◉ | ◉ | ◉ | ◉ | ◉ | ◉ | ◉ | ◉ | ◉ | 12.6 |
| Ex. 6 | A-2 | ◉ | ◉ | ◉ | ◉ | ◉ | ◉ | ○ | ○ | ○ | ◉ | 2.7 |
| Ex. 7 | A-2 | ◉ | ◉ | ◉ | ◉ | ◉ | ◉ | ○ | ○ | ○ | ◉ | 6.8 |
| Ex. 8 | A-2 | ◉ | ◉ | ◉ | ◉ | ◉ | ◉ | ○ | ○ | ○ | ◉ | 1.5 |
| Ex. 9 | A-2 | ◉ | ◉ | ◉ | ◉ | ◉ | ◉ | ○ | ○ | ○ | ◉ | 3.8 |
| Ex. 10 | A-2 | ◉ | ◉ | ◉ | ◉ | ◉ | ◉ | ◉ | ◉ | ◉ | ◉ | 12.6 |
| Ex. 11 | A-3 | ◉ | ◉ | ◉ | ◉ | ◉ | ◉ | ○ | ○ | ○ | ◉ | 2.7 |
| Ex. 12 | A-3 | ◉ | ◉ | ◉ | ◉ | ◉ | ◉ | ◉ | ◉ | ◉ | ◉ | 6.8 |
| Ex. 13 | A-3 | ◉ | ◉ | ◉ | ◉ | ◉ | ◉ | ◉ | ◉ | ◉ | ◉ | 1.5 |
| Ex. 14 | A-3 | ◉ | ◉ | ◉ | ◉ | ◉ | ◉ | ◉ | ◉ | ◉ | ◉ | 3.8 |
| Ex. 15 | A-3 | ◉ | ◉ | ◉ | ◉ | ◉ | ◉ | ◉ | ◉ | ◉ | ◉ | 12.6 |
| Comp. Ex. 1 | A-1 | ◉ | ◉ | ◉ | ○ | X | X | XX | XX | XX | ◉ | — |
| Comp. Ex. 2 | A-2 | ◉ | ◉ | ◉ | ○ | X | X | XX | XX | XX | ◉ | — |
| Comp. Ex. 3 | A-3 | ◉ | ◉ | ◉ | ○ | X | X | XX | XX | XX | ◉ | — |
| Comp. Ex. 4 | A-3 | ◉ | ◉ | ◉ | ○ | ○ | X | XX | XX | XX | ◉ | 0.009 |

TABLE 2

| | Organic resin | Adhesion to metal material | Naked corrosion resistance (time) | | | | | | | | Adhesion to paint after boiling water resistance treatment |
|---|---|---|---|---|---|---|---|---|---|---|---|
| | | | 24 | 48 | 72 | 120 | 240 | 360 | 480 | 600 | |
| Ex. 16 | A-1 | ◉ | ◉ | ◉ | ◉ | ◉ | ◉ | ◉ | ○ | ○ | ◉ |
| Ex. 17 | A-1 | ◉ | ◉ | ◉ | ◉ | ◉ | ◉ | ◉ | ○ | ○ | ◉ |
| Ex. 18 | A-1 | ◉ | ◉ | ◉ | ◉ | ◉ | ◉ | ◉ | ◉ | ◉ | ◉ |
| Ex. 19 | A-1 | ◉ | ◉ | ◉ | ◉ | ◉ | ◉ | ◉ | ◉ | ◉ | ◉ |
| Ex. 20 | A-2 | ◉ | ◉ | ◉ | ◉ | ◉ | ◉ | ◉ | ○ | ○ | ◉ |
| Ex. 21 | A-2 | ◉ | ◉ | ◉ | ◉ | ◉ | ◉ | ◉ | ○ | ○ | ◉ |
| Ex. 22 | A-2 | ◉ | ◉ | ◉ | ◉ | ◉ | ◉ | ◉ | ◉ | ◉ | ◉ |
| Ex. 23 | A-2 | ◉ | ◉ | ◉ | ◉ | ◉ | ◉ | ◉ | ○ | ○ | ◉ |
| Ex. 24 | A-3 | ◉ | ◉ | ◉ | ◉ | ◉ | ◉ | ◉ | ○ | ○ | ◉ |
| Ex. 25 | A-3 | ◉ | ◉ | ◉ | ◉ | ◉ | ◉ | ◉ | ○ | ○ | ◉ |
| Ex. 26 | A-3 | ◉ | ◉ | ◉ | ◉ | ◉ | ◉ | ◉ | ◉ | ◉ | ◉ |
| Ex. 27 | A-3 | ◉ | ◉ | ◉ | ◉ | ◉ | ◉ | ◉ | ◉ | ◉ | ◉ |
| Ex. 28 | A-4 | ◉ | ◉ | ◉ | ◉ | ◉ | ◉ | ◉ | ○ | ○ | ◉ |
| Ex. 29 | A-4 | ◉ | ◉ | ◉ | ◉ | ◉ | ◉ | ◉ | ○ | ○ | ◉ |
| Ex. 30 | A-4 | ◉ | ◉ | ◉ | ◉ | ◉ | ◉ | ◉ | ◉ | ◉ | ◉ |
| Ex. 31 | A-4 | ◉ | ◉ | ◉ | ◉ | ◉ | ◉ | ◉ | ◉ | ◉ | ◉ |
| Comp. Ex. 4 | A-1 | ◉ | ◉ | ◉ | ○ | X | X | XX | XX | XX | ◉ |
| Comp. Ex. 5 | A-2 | ◉ | ◉ | ◉ | ○ | X | XX | XX | XX | XX | ◉ |
| Comp. Ex. 6 | A-3 | ◉ | ◉ | ○ | X | XX | XX | XX | XX | XX | ◉ |
| Comp. Ex. 7 | — | ◉ | ◉ | ○ | X | XX | XX | XX | XX | XX | X |

TABLE 3

| | Organic resin | Adhesion to metal material | Naked corrosion resistance (time) | | | | | | | | Adhesion to paint after boiling water resistance treatment | P/Al ratio (equivalent) |
|---|---|---|---|---|---|---|---|---|---|---|---|---|
| | | | 24 | 48 | 72 | 120 | 240 | 360 | 480 | 600 | | |
| Ex. 32 | A-1 | ◉ | ◉ | ◉ | ◉ | ◉ | ◉ | ◉ | ◉ | ○ | ◉ | 1.4 |
| Ex. 33 | A-1 | ◉ | ◉ | ◉ | ◉ | ◉ | ◉ | ◉ | ◉ | ◉ | ◉ | 5.2 |
| Ex. 34 | A-1 | ◉ | ◉ | ◉ | ◉ | ◉ | ◉ | ◉ | ◉ | ○ | ◉ | 5.5 |
| Ex. 35 | A-1 | ◉ | ◉ | ◉ | ◉ | ◉ | ◉ | ◉ | ◉ | ◉ | ◉ | 5.4 |
| Ex. 36 | A-2 | ◉ | ◉ | ◉ | ◉ | ◉ | ◉ | ◉ | ◉ | ○ | ◉ | 1.4 |
| Ex. 37 | A-2 | ◉ | ◉ | ◉ | ◉ | ◉ | ◉ | ◉ | ◉ | ◉ | ◉ | 5.2 |

TABLE 3-continued

| | Organic resin | Adhesion to metal material | Naked corrosion resistance (time) | | | | | | | | Adhesion to paint after boiling water resistance treatment | P/Al ratio (equivalent) |
|---|---|---|---|---|---|---|---|---|---|---|---|---|
| | | | 24 | 48 | 72 | 120 | 240 | 360 | 480 | 600 | | |
| Ex. 38 | A-2 | ⊙ | ⊙ | ⊙ | ⊙ | ⊙ | ⊙ | ⊙ | ⊙ | ○ | ⊙ | 5.5 |
| Ex. 39 | A-2 | ⊙ | ⊙ | ⊙ | ⊙ | ⊙ | ⊙ | ⊙ | ⊙ | ⊙ | ⊙ | 5.4 |
| Ex. 40 | A-3 | ⊙ | ⊙ | ⊙ | ⊙ | ⊙ | ⊙ | ⊙ | ⊙ | ○ | ⊙ | 1.4 |
| Ex. 41 | A-3 | ⊙ | ⊙ | ⊙ | ⊙ | ⊙ | ⊙ | ⊙ | ⊙ | ⊙ | ⊙ | 5.2 |
| Ex. 42 | A-3 | ⊙ | ⊙ | ⊙ | ⊙ | ⊙ | ⊙ | ⊙ | ⊙ | ⊙ | ⊙ | 5.5 |
| Ex. 43 | A-3 | ⊙ | ⊙ | ⊙ | ⊙ | ⊙ | ⊙ | ⊙ | ⊙ | ⊙ | ⊙ | 5.4 |
| Ex. 44 | A-4 | ⊙ | ⊙ | ⊙ | ⊙ | ⊙ | ⊙ | ⊙ | ⊙ | ○ | ⊙ | 1.4 |
| Ex. 45 | A-4 | ⊙ | ⊙ | ⊙ | ⊙ | ⊙ | ⊙ | ⊙ | ⊙ | ⊙ | ⊙ | 5.2 |
| Ex. 46 | A-4 | ⊙ | ⊙ | ⊙ | ⊙ | ⊙ | ⊙ | ⊙ | ⊙ | ○ | ⊙ | 5.5 |
| Ex. 47 | A-4 | ⊙ | ⊙ | ⊙ | ⊙ | ⊙ | ⊙ | ⊙ | ⊙ | ⊙ | ⊙ | 5.4 |

TABLE 4

| | Crosscut maximum swelling width | Residual element percentage after salt water spray treatment | | |
|---|---|---|---|---|
| | | P | Si | Al |
| Ex. 1 | 1 | 0.6 | 0.73 | 0.82 |
| Ex. 2 | 1.9 | 0.75 | 0.86 | 0.75 |
| Ex. 3 | 1.5 | 0.8 | 0.91 | 0.89 |
| Ex. 15 | 1.2 | 0.76 | 0.94 | 0.91 |
| Com. Ex. 1 | 9.3 | — | 0.05 | 0.04 |
| Com. Ex. 2 | 8.7 | 0.12 | 0.07 | — |
| Com. Ex. 3 | 8.5 | 0.25 | — | 0.15 |
| Com. Ex. 4 | 6.1 | 0.2 | — | 0.17 |
| Ex. 27 | 1.3 | 0.56 | 0.95 | 0.91 |
| Ex. 28 | 1.8 | 0.54 | 0.9 | 0.85 |
| Ex. 29 | 1.8 | 0.78 | 0.82 | 0.77 |
| Ex. 30 | 0.9 | 0.68 | 0.95 | 0.89 |
| Ex. 31 | 1 | 0.82 | 0.94 | 0.94 |
| Ex. 32 | 1.5 | 0.81 | 0.96 | 0.92 |
| Ex. 33 | 1.2 | 0.82 | 0.95 | 0.95 |
| Ex. 34 | 1.8 | 0.83 | 0.96 | 0.91 |
| Ex. 35 | 0.8 | 0.81 | 0.97 | 0.91 |
| Ex. 36 | 2 | 0.82 | 0.95 | 0.92 |
| Ex. 37 | 1.8 | 0.79 | 0.97 | 0.95 |
| Ex. 38 | 1.5 | 0.73 | 0.97 | 0.93 |
| Ex. 39 | 0.8 | 0.85 | 0.95 | 0.93 |
| Ex. 40 | 0 | 0.77 | 0.96 | 0.91 |
| Ex. 41 | 0.5 | 0.82 | 0.97 | 0.96 |
| Ex. 42 | 0.8 | 0.85 | 0.95 | 0.94 |
| Ex. 43 | 1.5 | 0.83 | 0.95 | 0.92 |
| Ex. 44 | 2 | 0.79 | 0.98 | 0.9 |
| Ex. 45 | 1.5 | 0.8 | 0.96 | 0.93 |
| Ex. 46 | 1.8 | 0.81 | 0.95 | 0.95 |
| Ex. 47 | 1.2 | 0.85 | 0.97 | 0.95 |

TABLE 5

| | | Naked corrosion resistance (SST spray time) | | | | | | | | | Adhesion to metal material | Adhesion to a paint |
|---|---|---|---|---|---|---|---|---|---|---|---|---|
| | | 100 | 120 | 168 | 240 | 480 | 600 | 720 | 840 | 960 | | |
| Ex. 48 | Flat | ⊙ | ⊙ | ⊙ | ⊙ | ⊙ | ○ | — | — | — | ⊙ | ⊙ |
| | Procd. | ⊙ | ⊙ | ⊙ | ⊙ | ○ | — | — | — | — | ⊙ | ⊙ |
| Ex. 49 | Flat | ⊙ | ⊙ | ⊙ | ⊙ | ⊙ | ⊙ | ○ | — | — | ⊙ | ⊙ |
| | Procd. | ⊙ | ⊙ | ⊙ | ⊙ | ○ | — | — | — | — | ⊙ | ⊙ |
| Ex. 50 | Flat | ⊙ | ⊙ | ⊙ | ⊙ | ⊙ | ⊙ | ⊙ | ⊙ | ○ | ⊙ | ⊙ |
| | Procd. | ⊙ | ⊙ | ⊙ | ⊙ | ⊙ | ⊙ | ○ | — | — | ⊙ | ⊙ |
| Ex. 51 | Flat | ⊙ | ⊙ | ⊙ | ⊙ | ⊙ | ⊙ | ⊙ | ⊙ | ○ | ⊙ | ⊙ |
| | Procd. | ⊙ | ⊙ | ⊙ | ⊙ | ⊙ | ⊙ | ○ | — | — | ⊙ | ⊙ |
| Ex. 52 | Flat | ⊙ | ⊙ | ⊙ | ⊙ | ⊙ | ⊙ | ⊙ | ⊙ | ○ | ⊙ | ⊙ |
| | Procd. | ⊙ | ⊙ | ⊙ | ⊙ | ⊙ | ⊙ | ○ | — | — | ⊙ | ⊙ |
| Ex. 53 | Flat | ⊙ | ⊙ | ⊙ | ⊙ | ⊙ | ⊙ | ⊙ | ⊙ | ○ | ⊙ | ⊙ |
| | Procd. | ⊙ | ⊙ | ⊙ | ⊙ | ⊙ | ⊙ | ○ | — | — | ⊙ | ⊙ |

TABLE 6

| | | Naked corrosion resistance (SST spray time) | | | | | | | | | Adhesion to metal material | Adhesion to a paint |
|---|---|---|---|---|---|---|---|---|---|---|---|---|
| | | 100 | 120 | 168 | 240 | 360 | 480 | 600 | 840 | 960 | | |
| Ex. 54 | Flat | ⊚ | ⊚ | ⊚ | ⊚ | ⊚ | ⊚ | ⊚ | ⊚ | ○ | ⊚ | ⊚ |
| | Procd. | ⊚ | ⊚ | ⊚ | ⊚ | ⊚ | ⊚ | ○ | — | — | | |
| Ex. 55 | Flat | ⊚ | ⊚ | ⊚ | ⊚ | ⊚ | ⊚ | ⊚ | ⊚ | ○ | ⊚ | ⊚ |
| | Procd. | ⊚ | ⊚ | ⊚ | ⊚ | ⊚ | ⊚ | ○ | — | — | | |
| Ex. 56 | Flat | ⊚ | ⊚ | ⊚ | ⊚ | ⊚ | ⊚ | ⊚ | ○ | — | ⊚ | ⊚ |
| | Procd. | ⊚ | ⊚ | ⊚ | ⊚ | ⊚ | ○ | — | — | — | | |
| Ex. 57 | Flat | ⊚ | ⊚ | ⊚ | ⊚ | ⊚ | ⊚ | ⊚ | ○ | — | ⊚ | ⊚ |
| | Procd. | ⊚ | ⊚ | ⊚ | ⊚ | ⊚ | ○ | — | — | — | | |
| Ex. 58 | Flat | ⊚ | ⊚ | ⊚ | ⊚ | ⊚ | ⊚ | ⊚ | ○ | — | ⊚ | ⊚ |
| | Procd. | ⊚ | ⊚ | ⊚ | ⊚ | ⊚ | ○ | — | — | — | | |
| Com. Ex. 9 | Flat | ⊚ | ⊚ | △ | — | — | | | | | ○ | △ |
| | Procd. | △ | — | — | | | | | | | | |
| Com. Ex. 10 | Flat | ⊚ | ⊚ | ○ | — | — | | | | | ○ | △ |
| | Procd. | △ | — | — | | | | | | | | |
| Com. Ex. 11 | Flat | ⊚ | ⊚ | ○ | — | — | | | | | ○ | ○ |
| | Procd. | ○ | △ | — | — | | | | | | | |
| Com. Ex. 12 | Flat | ⊚ | ⊚ | ○ | — | — | | | | | ○ | ○ |
| | Procd. | ○ | △ | — | — | | | | | | | |

TABLE 7

| | | Naked corrosion resistance (SST spray time) | | | | | | | | | Adhesion to metal material | Adhesion to a paint |
|---|---|---|---|---|---|---|---|---|---|---|---|---|
| | | 2 | 8 | 12 | 24 | 36 | 48 | 120 | 240 | 360 | | |
| Ex. 59 | Flat | ⊚ | ⊚ | ⊚ | ⊚ | ⊚ | ○ | — | — | — | ⊚ | ⊚ |
| | Procd. | ⊚ | ⊚ | ⊚ | ⊚ | ○ | — | — | — | — | | |
| Ex. 60 | Flat | ⊚ | ⊚ | ⊚ | ⊚ | ⊚ | ⊚ | ⊚ | ○ | — | ⊚ | ⊚ |
| | — | — | — | — | — | — | — | — | — | — | | |

This application is based on Japanese Patent application Nos. 112442/1998, 133029/1998 and 160079/1998, the contents of which are incorporated hereinto by reference.

What is claimed is:

1. A chromium-free agent for treating metallic surface, wherein the agent is an aqueous solution or dispersion having a pH of 1.5–3.5 and comprising the following (i)–(iv):
    (i) at least one of (A) a mixture of an aluminum salt and an inorganic oxide particle and (B) an aluminum-containing inorganic oxide particle comprising aluminum, oxygen, and at least one additional element other than aluminum or oxygen,
    (ii) a salt of a metal other than aluminum,
    (iii) a phosphorus compound, and
    (iv) a resin and/or a precursor thereof, provided that when (i) is a mixture of an aluminum salt and inorganic oxide particle, the equivalent ratio of phosphorus/aluminum is not less than 0.1.

2. The agent for treating metallic surface of claim 1, wherein the inorganic oxide particle is a particle of an oxide of at least one element selected from the group consisting of Si, Fe, Ge, Ti, Zr, Mg, Sn, Sb and Al.

3. The agent for treating metallic surface of claim 1, wherein the inorganic oxide particle is an $SiO_2$ particle.

4. The agent for treating metallic surface of claim 1, wherein the inorganic oxide particle content is 2–80 parts by weight per 100 parts by weight of the resin and/or the precursor thereof.

5. The agent for treating metallic surface of claim 1, wherein the inorganic oxide particle has a particle size of 1–20 nm.

6. The agent for treating metallic surface of claim 1, wherein the aluminum-containing inorganic oxide particle is an inorganic oxide particle surface-treated with an aluminum compound.

7. The agent for treating metallic surface of claim 1, wherein the inorganic oxide of the aluminum-containing inorganic oxide particle is an oxide of at least one element selected from the group consisting of Si, Fe, Ge, Ti, Zr, Mg, Sn and Sb.

8. The agent for treating metallic surface of claim 1, wherein the inorganic oxide of the aluminum-containing inorganic oxide particle is $SiO_2$.

9. The agent for treating metallic surface of claim 1, wherein the aluminum-containing inorganic oxide particle content is 2–80 parts by weight per 100 parts by weight of the resin and/or the precursor thereof.

10. The agent for treating metallic surface of claim 1, wherein the aluminum-containing inorganic oxide particle has a particle size of 1–20 nm.

11. The agent for treating metallic surface of claim 1, further comprising an aluminum salt or an inorganic oxide particle when (i) is the aluminum-containing inorganic oxide particle.

12. The agent for treating metallic surface of claim 1, wherein the aluminum salt is an aluminum salt of at least one member selected from the group consisting of phosphate, monohydrogenphosphate, dihydrogenphosphate, acetate, formate, nitrate, sulfate, chloride, bromide, fluoride, oxalate, nitrite, sulfite, hydrogensulfite, silicate, bioxalate, bifluoride, carbonate, hydrogencarbonate, hydrogensulfate, polyphosphate, hypophosphite, tripolyphosphate, hexametaphosphate, polymetaphosphate and phosphonate.

13. The agent for treating metallic surface of claim 1, wherein the aluminum salt is an aluminum salt of at least one member selected from the group consisting of phosphate, monohydrogenphosphate and dihydrogenphosphate.

14. The agent for treating metallic surface of claim 1, wherein the aluminum salt content is 0.005–10 moles per 100 g of the resin and/or the precursor thereof.

15. The agent for treating metallic surface of claim 1, wherein the salt of the metal other than aluminum is a salt of at least one member selected from polyvalent metals.

16. The agent for treating metallic surface of claim 1, wherein the salt of the metal other than aluminum is a salt of at least one member selected from the group consisting of Cu, Co, Fe, Mn, Sn, V, Ba, Mg, Zr, W, Mo, Ca, Sr, Nb, Y and Zn.

17. The agent for treating metallic surface of claim 1, wherein the salt of the metal other than aluminum is a salt of at least one member selected from the group consisting of Mn, Mg, Zr, W, Mo, Ca and Sr.

18. The agent for treating metallic surface of claim 1, wherein the salt of the metal other than aluminum is an Mn salt.

19. The agent for treating metallic surface of claim 1, wherein the salt of the metal other than aluminum is a salt of a metal other than aluminum, which is at least one member selected from the group consisting of phosphate, monohydrogenphosphate, dihydrogenphosphate, acetate, formate, nitrate, sulfate, chloride, bromide, fluoride, oxalate, nitrite, sulfite, hydrogensulfite, silicate, bioxalate, bifluoride, carbonate, hydrogencarbonate, hydrogensulfate, polyphosphate, hypophosphite, tripolyphosphate, hexametaphosphate, polymetaphosphate and phosphonate.

20. The agent for treating metallic surface of claim 1, wherein the salt of the metal other than aluminum is a salt of a metal other than aluminum, which is at least one member selected from the group consisting of phosphate, monohydrogenphosphate and dihydrogenphosphate.

21. The agent for treating metallic surface of claim 1, wherein a content of the salt of the metal other than aluminum is 0.005–10 moles per 100 g of the resin and/or the precursor thereof.

22. The agent for treating metallic surface of claim 1, wherein the total content of the aluminum salt and the salt of the metal other than aluminum is 0.005–10 moles per 100 g of the resin and/or the precursor thereof.

23. The agent for treating metallic surface of claim 1, wherein the resin is at least one member selected from the group consisting of acrylic resin, polyester resin, epoxy resin, acryl-epoxy resin, acryl-modified polyester resin, epoxy-modified polyester resin, urethane-modified polyester resin, acryl-modified polyurethane resin and acryl-modified polyester polyurethane resin.

24. The agent for treating metallic surface of claim 1, wherein a content of the resin and/or the precursor thereof is 30–80 wt % of the entire constituent component.

25. A metal material surface-treated with the agent for treating metallic surface of claim 1, wherein the agent forms a surface treatment layer with a thickness of not more than 5 μm on the metal material.

26. A coated material comprising a metal material that is a steel plate or plated steel plate, a chromium-free surface treatment layer having a thickness of not more than 5 μm and a resin coating layer successively laminated, wherein, when the surface of the resin coating layer of the coated metal material is cut to mark an X shape with a knife that reaches the metal material and the coated metal material is subjected to a salt water spray treatment defined in JIS Z 2371, the maximum swelling width of the resin coating layer after 360 hours of the treatment is not more than 2 mm.

27. The coated metal material of claim 26, wherein the metal material is plated.

28. The coated metal material of claim 26, wherein the surface treatment layer has a thickness of not more than 3 μm.

29. The coated metal material of claim 26, wherein the surface treatment layer is formed with a chromium-free agent for treating metallic surface comprising the following (i)–(iv):

(i) at least one of (A) a mixture of an aluminum salt and an inorganic oxide particle and (B) an aluminum-containing inorganic oxide particle comprising aluminum, oxygen and at least one element other than these two, (ii) a salt of a metal other than aluminum, (iii) a phosphorus compound, and (iv) a resin and/or a precursor thereof, provided that when (i) is a mixture of an aluminum salt and an inorganic oxide particle, the equivalent ratio of phosphorus/aluminum is not less than 0.1.

30. A surface-treated metal material comprising a metal material and a chromium-free surface treatment layer having a thickness of not more than 5 μm formed on the metal material, wherein, when the surface-treated metal material is subjected to a salt water spray treatment defined in JIS Z 2371, the surface treatment layer has a residual Si percentage as represented by the following formula after 360 hours of the treatment of not less than 0.5 and/or a residual P percentage as represented by the following formula after 360 hours of the treatment of not less than 0.5:

Residual Si percentage of the surface treatment layer=Si content of the surface treatment layer after 360 hours of the treatment/Si content of the surface treatment layer before the treatment Residual P percentage of the surface treatment layer=P content of the surface treatment layer after 360 hours of the treatment/P content of the surface treatment layer before the treatment.

31. The surface-treated metal material of claim 30, wherein the residual Si percentage is not less than 0.6.

32. The surface-treated metal material of claim 30, wherein the residual P percentage is not less than 0.6.

33. The surface-treated metal material of claim 30, wherein the surface treatment layer is formed with a chromium-free agent for treating metallic surface comprising the following (i)–(iv):

(i) at least one of (A) a mixture of an aluminum salt and an inorganic oxide particle and (B) an aluminum-containing inorganic oxide particle comprising aluminum, oxygen and at least one element other than these two, (ii) a salt of a metal other than aluminum, (iii) a phosphorus compound, and (iv) a resin and/or a precursor thereof, provided that when (i) is a mixture of an aluminum salt and an inorganic oxide particle, the equivalent ratio of phosphorus/aluminum is not less than 0.1.

34. A surface-treated metal material comprising a metal material and a chromium-free surface treatment layer having a thickness of not more than 5 μm formed on the metal material, wherein, when the surface-treated metal material is subjected to a salt water spray treatment defined in JIS Z 2371, the surface treatment layer has a residual Al percentage as represented by the following formula after 360 hours of the treatment of not less than 0.5:

Residual Al percentage of the surface treatment layer=Al content of the surface treatment layer after 360 hours of the treatment/Al content of the surface treatment layer before the treatment.

35. The surface-treated metal material of claim 34, wherein the residual Al percentage is not less than 0.6.

36. The surface-treated metal material of claim 34, wherein the surface treatment layer is formed with a chromium-free agent for treating metallic surface comprising the following (i)–(iv):

(i) at least one of (A) a mixture of an aluminum salt and an inorganic oxide particle and (B) an aluminum-containing inorganic oxide particle comprising aluminum, oxygen and at least one element other than these two, (ii) a salt of a metal other than aluminum, (iii) a phosphorus compound, and (iv) a resin and/or a precursor thereof, provided that when (i) is a mixture of an aluminum salt and an inorganic oxide particle, the equivalent ratio of phosphorus/aluminum is not less than 0.1.

37. A surface-treated metal material comprising a metal material and a surface treatment layer having a thickness of not more than 5 $\mu$m, wherein the surface treatment layer is formed by applying a chromium-free agent for treating a metallic surface, wherein the agent is an aqueous solution or dispersion comprising the following (i) to (iv):

(i) at least one of (A) a mixture of an aluminum salt and an inorganic oxide particle and (B) an aluminum-containing inorganic oxide particle comprising aluminum, oxygen and at least one additional element other than aluminum or oxygen, (ii) a salt of a metal other than aluminum, (iii) a phosphorus compound, and (iv) a resin and/or a precursor thereof, provided that when (i) is a mixture of an aluminum salt and an inorganic oxide particle, the equivalent ratio of phosphorus/aluminum is not less than 0.1.

\* \* \* \* \*